(12) United States Patent
Eidsmore et al.

(10) Patent No.: US 7,686,041 B2
(45) Date of Patent: Mar. 30, 2010

(54) MODULAR SURFACE MOUNT MANIFOLD ASSEMBLIES

(75) Inventors: Paul G. Eidsmore, Santa Cruz, CA (US); Michael J. Mohlenkamp, University Heights, OH (US); Benjamin J. Olechnowicz, Cuyahoga Falls, OH (US); Christine M. Schilt Deines, Concord, OH (US); Douglas Nordstrom, Shaker Heights, OH (US); James McCoy, Mayfield Heights, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 11/378,198

(22) Filed: Mar. 17, 2006

(65) Prior Publication Data

US 2006/0157130 A1 Jul. 20, 2006

Related U.S. Application Data

(60) Continuation of application No. 10/154,154, filed on May 23, 2002, now Pat. No. 7,048,007, which is a division of application No. 09/544,020, filed on Apr. 6, 2000, now Pat. No. 6,629,546, which is a continuation of application No. PCT/US99/10980, filed on May 18, 1999, which is a continuation-in-part of application No. PCT/US99/04972, filed on Mar. 5, 1999.

(60) Provisional application No. 60/102,277, filed on Sep. 29, 1998, provisional application No. 60/085,817, filed on May 18, 1998, provisional application No. 60/076,871, filed on Mar. 5, 1998.

(51) Int. Cl.
*F16K 11/10* (2006.01)

(52) U.S. Cl. .................................................... 137/884

(58) Field of Classification Search ................ 137/269, 137/270, 271, 597, 884
See application file for complete search history.

(56) References Cited

U.S. PATENT DOCUMENTS 2,283,126 A 5/1942 Ray (Continued)

FOREIGN PATENT DOCUMENTS

DE 2630050 1/1978

(Continued)

OTHER PUBLICATIONS

International Search Report from PCT/US99/10980.

*Primary Examiner*—John Fox
(74) *Attorney, Agent, or Firm*—Calfee, Halter & Griswold LLP

(57) ABSTRACT

A modular manifold system is provided for interconnecting fluid components of a fluid system in a reduced area. The system is comprised of a one or more bridge fittings having an internal fluid passageway which has an inlet end in fluid communication with an outlet port of a first fluid component, and an outlet end in fluid communication with an inlet port of a second fluid component. The bridge fittings may additionally comprise two or more ports, which one of said ports may be in fluid communication with a manifold on another substrate level. The bridge fittings may be mounted within a channel of a backing plate for structural support or in channel blocks of varying sizes. An optional locator plate may be utilized which is mounted over the ends of the bridge fittings in order to align the inlet and outlet ports of the fluid components with the inlet and outlet ends of the bridge fittings. The bridge fittings may also be mounted to the locator plate in multiple directions forming multiple flow paths. Additionally, the bridge fittings may be stacked to form multiple layers where bridge fittings of one layer may be in fluid communication with bridge fittings of another layer. The invention may further comprise seals provided in a recess between the fluid ports and the mating bridge fittings ends.

7 Claims, 26 Drawing Sheets

U.S. PATENT DOCUMENTS

| | | | |
|---|---|---|---|
| 2,879,788 | A | 3/1959 | Beckett et al. |
| 3,523,600 | A | 8/1970 | Nelson |
| 3,572,368 | A | 3/1971 | Bullmer |
| 3,589,387 | A | 6/1971 | Raymond |
| 3,654,960 | A | 4/1972 | Kiernan |
| 3,806,088 | A | 4/1974 | Stoneman et al. |
| 3,863,666 | A | 2/1975 | Bonne et al. |
| 3,915,914 | A | 10/1975 | Friedrich |
| 4,082,324 | A | 4/1978 | Obrecht |
| 4,230,143 | A | 10/1980 | Dettmann et al. |
| 4,270,559 | A | 6/1981 | Wallberg |
| 4,415,004 | A | 11/1983 | Bouteille et al. |
| 4,458,841 | A | 7/1984 | Laakaniemi et al. |
| 4,483,365 | A | 11/1984 | Fallon |
| 4,601,087 | A | 7/1986 | Kawai et al. |
| 4,640,311 | A | 2/1987 | Martinet et al. |
| 4,657,047 | A | 4/1987 | Kolibas |
| 4,741,354 | A | 5/1988 | DeMild, Jr. |
| 4,807,660 | A | 2/1989 | Aslanian |
| 4,848,393 | A | 7/1989 | West |
| 4,934,411 | A | 6/1990 | Albrecht |
| 4,938,251 | A | 7/1990 | Furrow et al. |
| 5,020,570 | A | 6/1991 | Cotter |
| 5,040,714 | A | 8/1991 | McManigal |
| 5,106,169 | A | 4/1992 | Barefoot |
| 5,178,191 | A | 1/1993 | Schaefer |
| 5,178,651 | A | 1/1993 | Balma et al. |
| 5,301,717 | A | 4/1994 | Goedecke |
| 5,361,805 | A | 11/1994 | Mayeux |
| 5,368,062 | A | 11/1994 | Okumura et al. |
| 5,435,349 | A | 7/1995 | Borbone |
| 5,439,026 | A | 8/1995 | Moriya et al. |
| 5,488,925 | A * | 2/1996 | Kumada ............... 118/715 |
| 5,529,088 | A | 6/1996 | Asou |
| 5,567,868 | A | 10/1996 | Craig et al. |
| 5,605,179 | A | 2/1997 | Strong, Jr. et al. |
| 5,660,201 | A | 8/1997 | Turner |
| 5,662,143 | A | 9/1997 | Caughran |
| 5,680,883 | A | 10/1997 | Gluf, Jr. |
| 5,709,247 | A | 1/1998 | Hutton |
| 5,713,582 | A | 2/1998 | Swensen et al. |
| 5,720,317 | A | 2/1998 | Nimberger |
| 5,730,448 | A | 3/1998 | Swensen et al. |
| 5,735,532 | A | 4/1998 | Nolan et al. |
| 5,735,533 | A | 4/1998 | Nolan et al. |
| 5,769,110 | A | 6/1998 | Ohmi et al. |
| 5,836,355 | A | 11/1998 | Markulec et al. |
| 5,975,590 | A * | 11/1999 | Cowan et al. ......... 285/133.11 |
| 5,983,933 | A | 11/1999 | Ohmi et al. |
| 6,012,479 | A | 1/2000 | Fukushima et al. |
| 6,039,360 | A | 3/2000 | Ohmi et al. |
| 6,085,783 | A | 7/2000 | Hollingshead |
| 6,125,887 | A * | 10/2000 | Pinto ........................ 137/884 |
| 6,186,177 | B1 * | 2/2001 | Maher ....................... 137/884 |
| 6,283,155 | B1 | 9/2001 | Vu |
| 6,502,601 | B2 | 1/2003 | Eidsmore et al. |
| 6,546,961 | B2 | 4/2003 | Fukushima |
| 6,615,871 | B2 * | 9/2003 | Ohmi et al. ................. 137/884 |
| 6,629,546 | B2 | 10/2003 | Eidsmore et al. |
| 6,640,835 | B1 * | 11/2003 | Rohrberg et al. ........... 137/884 |
| 6,648,020 | B2 * | 11/2003 | Fujimoto et al. ........... 137/884 |
| 6,874,538 | B2 * | 4/2005 | Bennett ..................... 137/884 |
| 6,953,048 | B2 * | 10/2005 | Chuh ........................ 137/269 |
| 7,036,528 | B2 | 5/2006 | Eidsmore et al. |
| 7,048,007 | B2 * | 5/2006 | Nordstrom et al. .......... 137/884 |

FOREIGN PATENT DOCUMENTS

| | | |
|---|---|---|
| EP | 637712 | 2/1995 |
| EP | 715112 | 6/1996 |
| EP | 754896 | 1/1997 |
| EP | 816731 | 1/1998 |
| EP | 837278 | 4/1998 |
| EP | 844424 | 5/1998 |
| EP | 845623 | 6/1998 |
| EP | 859155 | 8/1998 |
| EP | 877170 | 11/1998 |
| EP | 905383 | 3/1999 |
| EP | 908929 | 4/1999 |
| WO | 99/45302 | 9/1999 |
| WO | 99/59392 | 11/1999 |

* cited by examiner

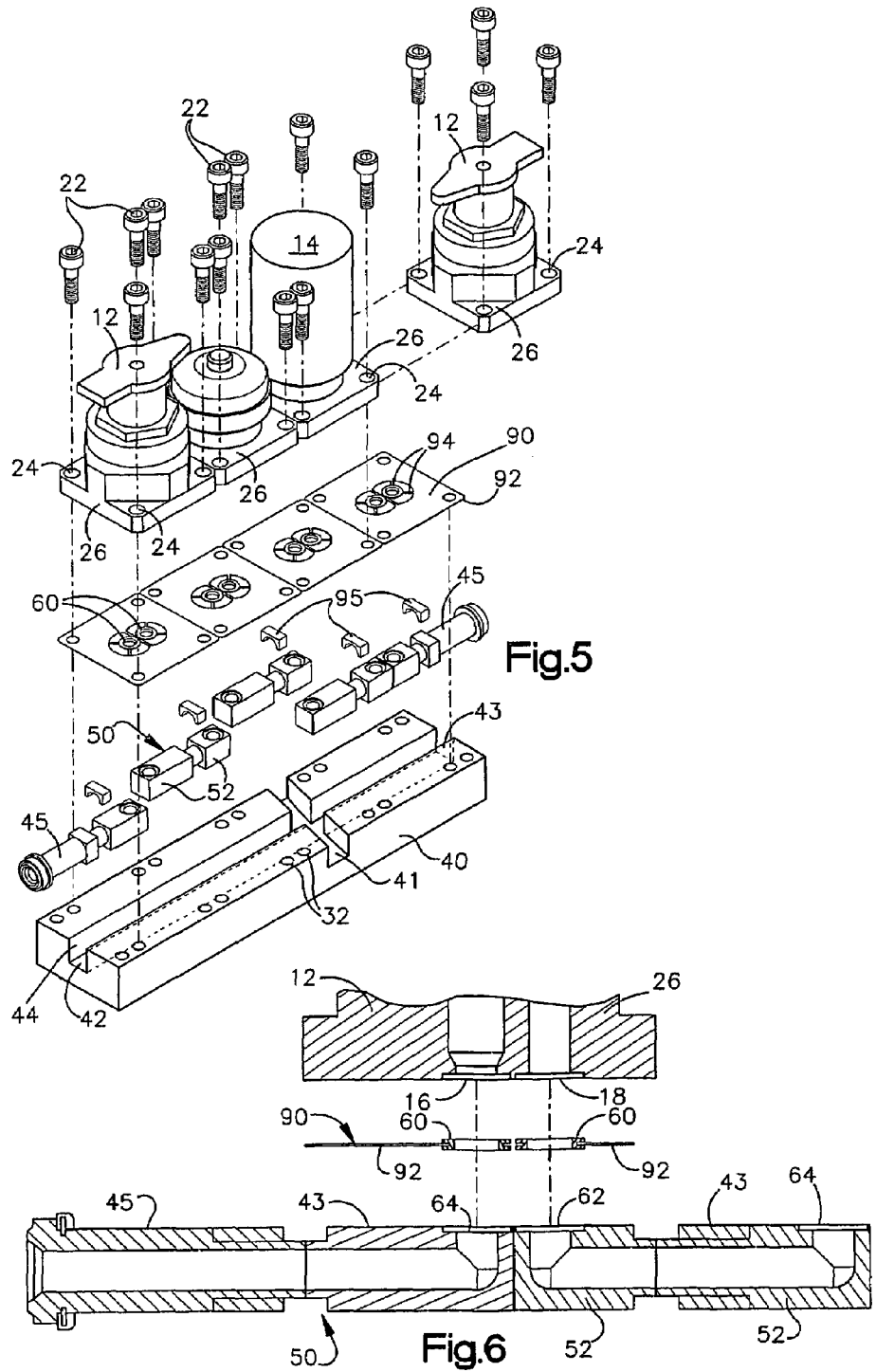

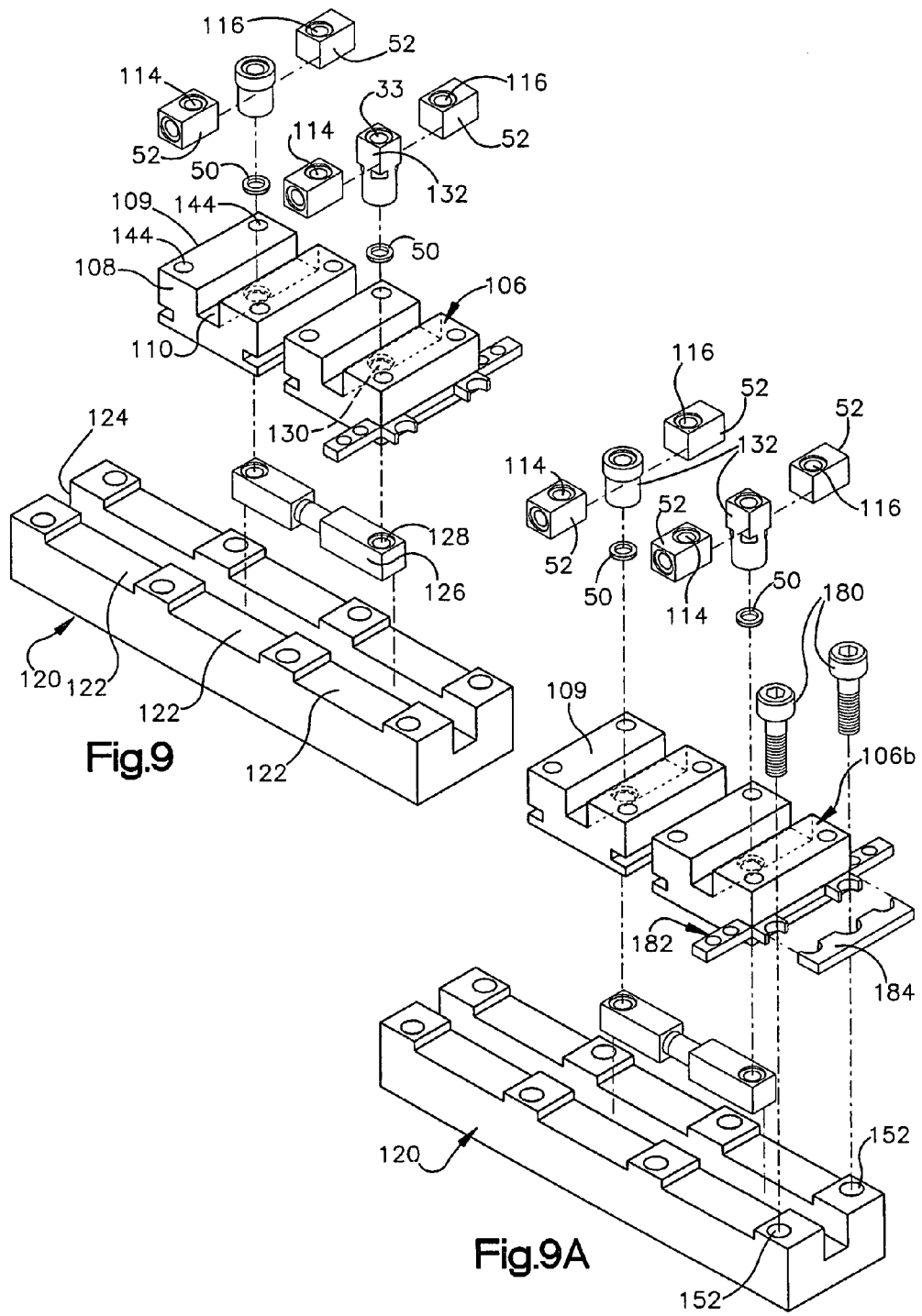

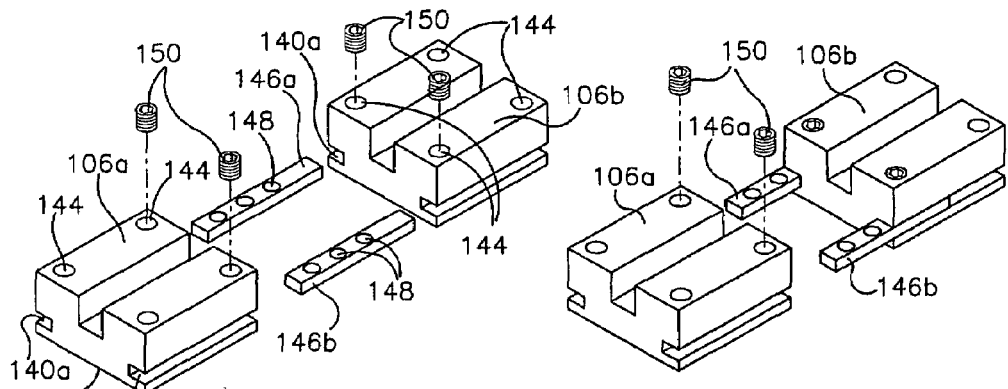
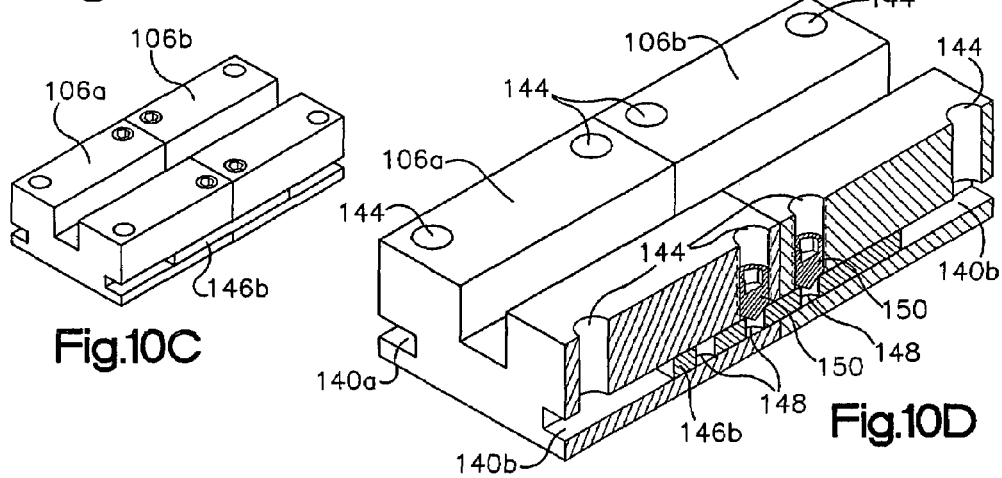
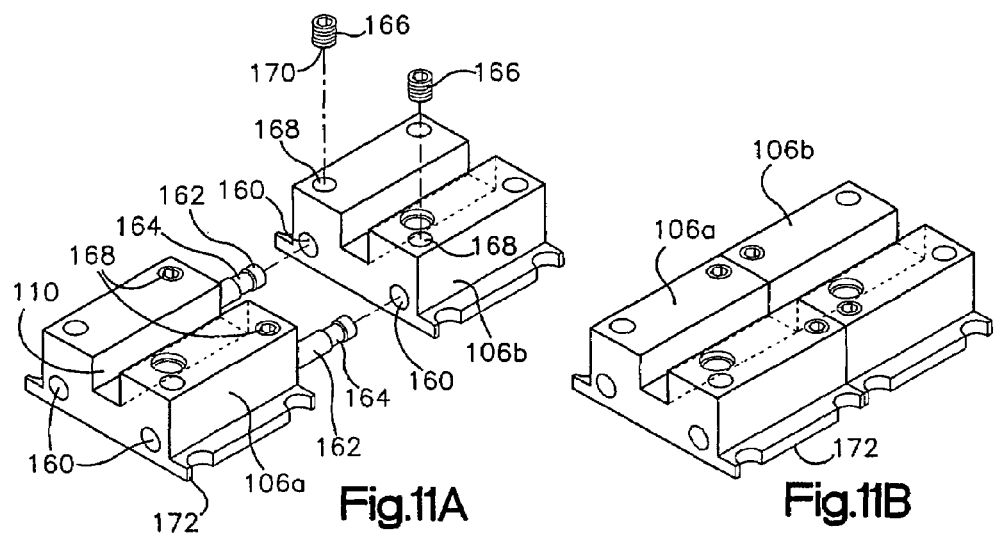

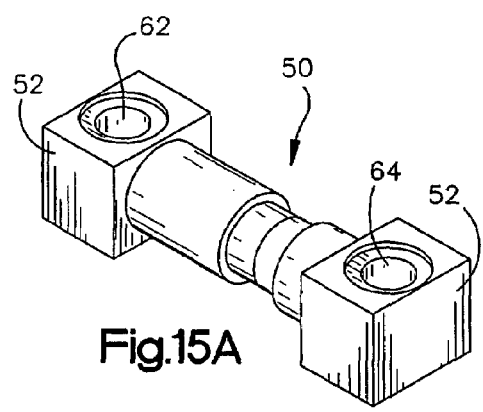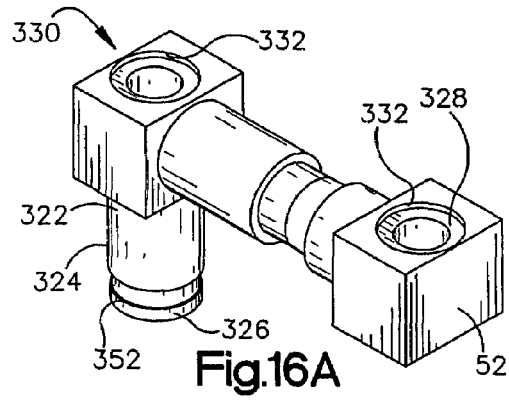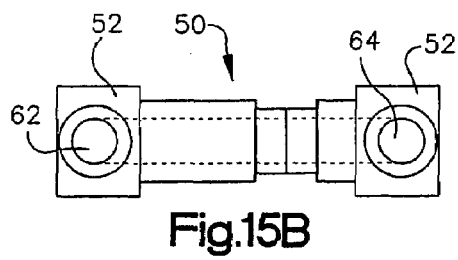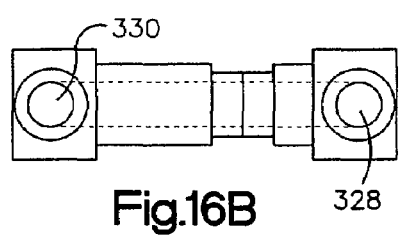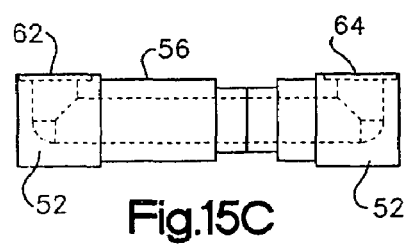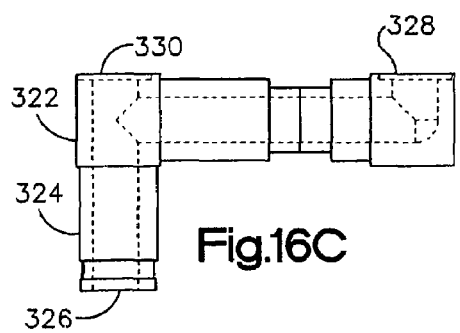

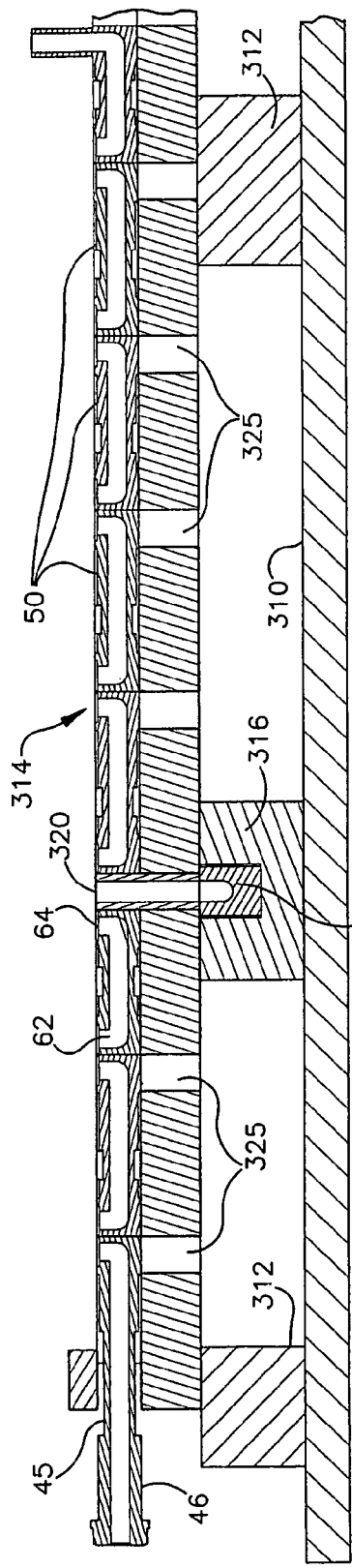
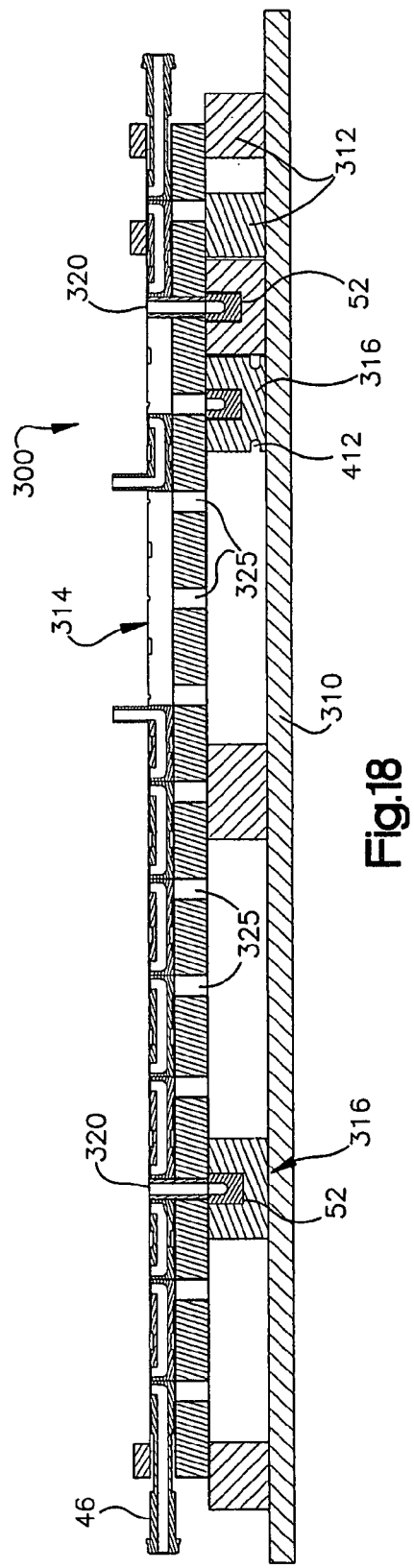
Fig.17
Fig.18

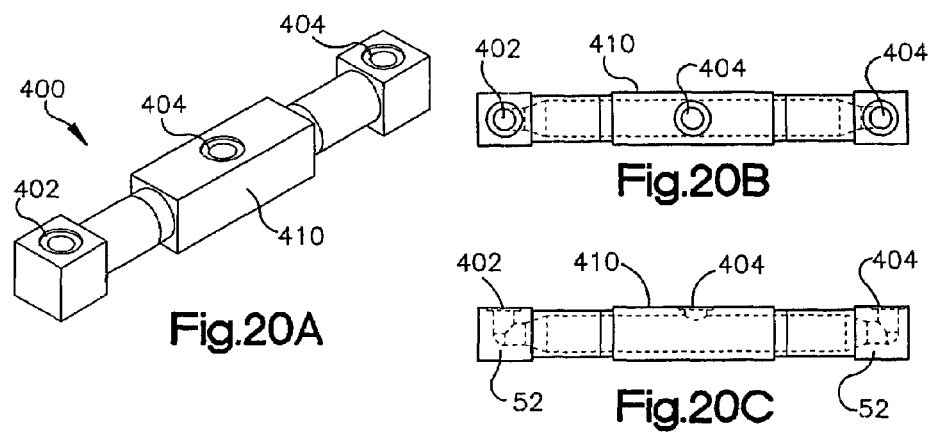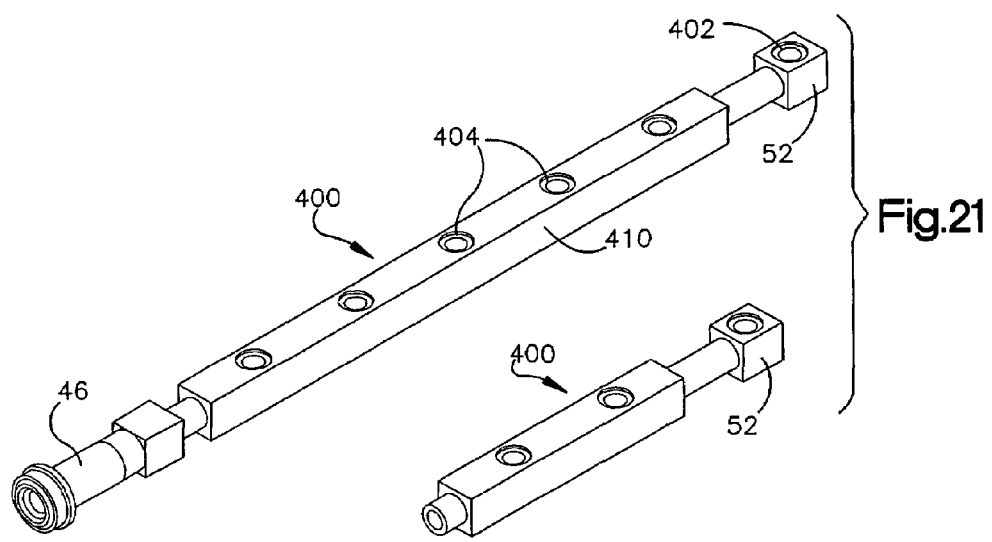

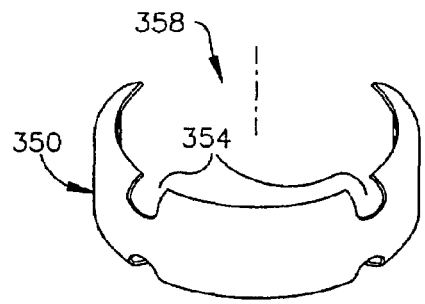 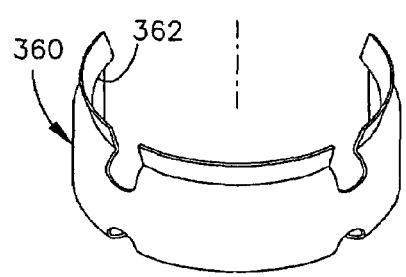
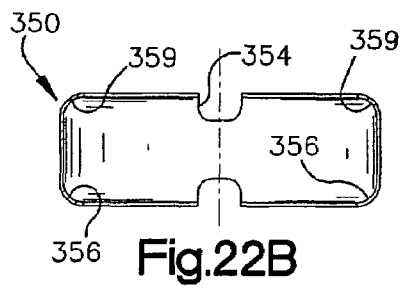 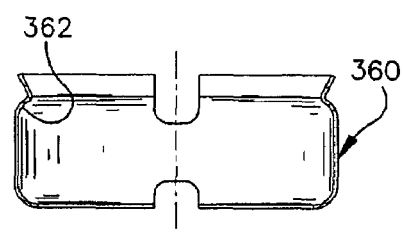
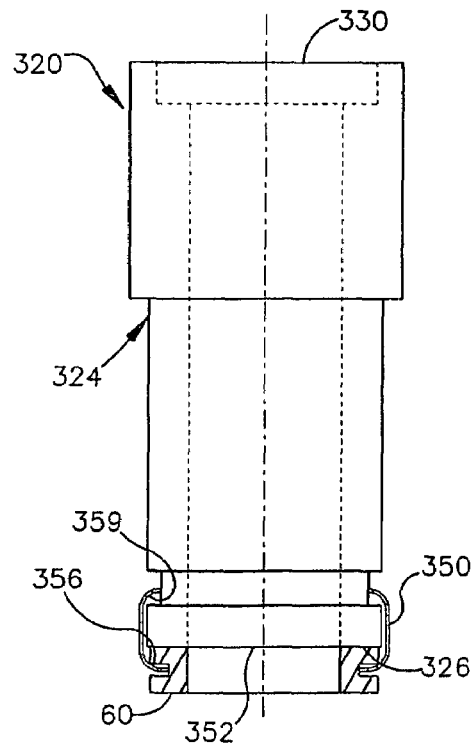 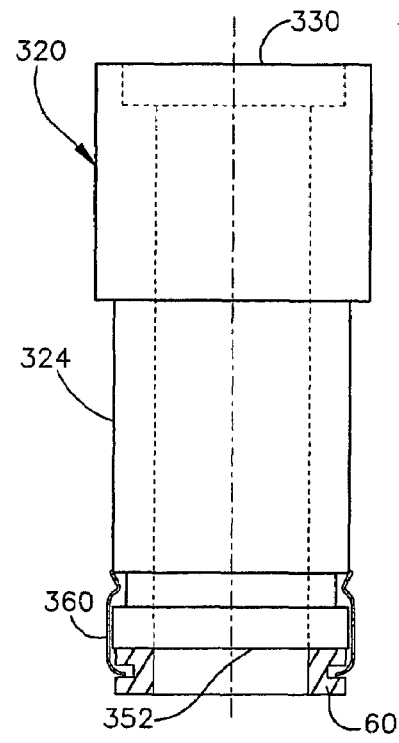
Fig.22A  Fig.23A
Fig.22B  Fig.23B
Fig.22C  Fig.23C

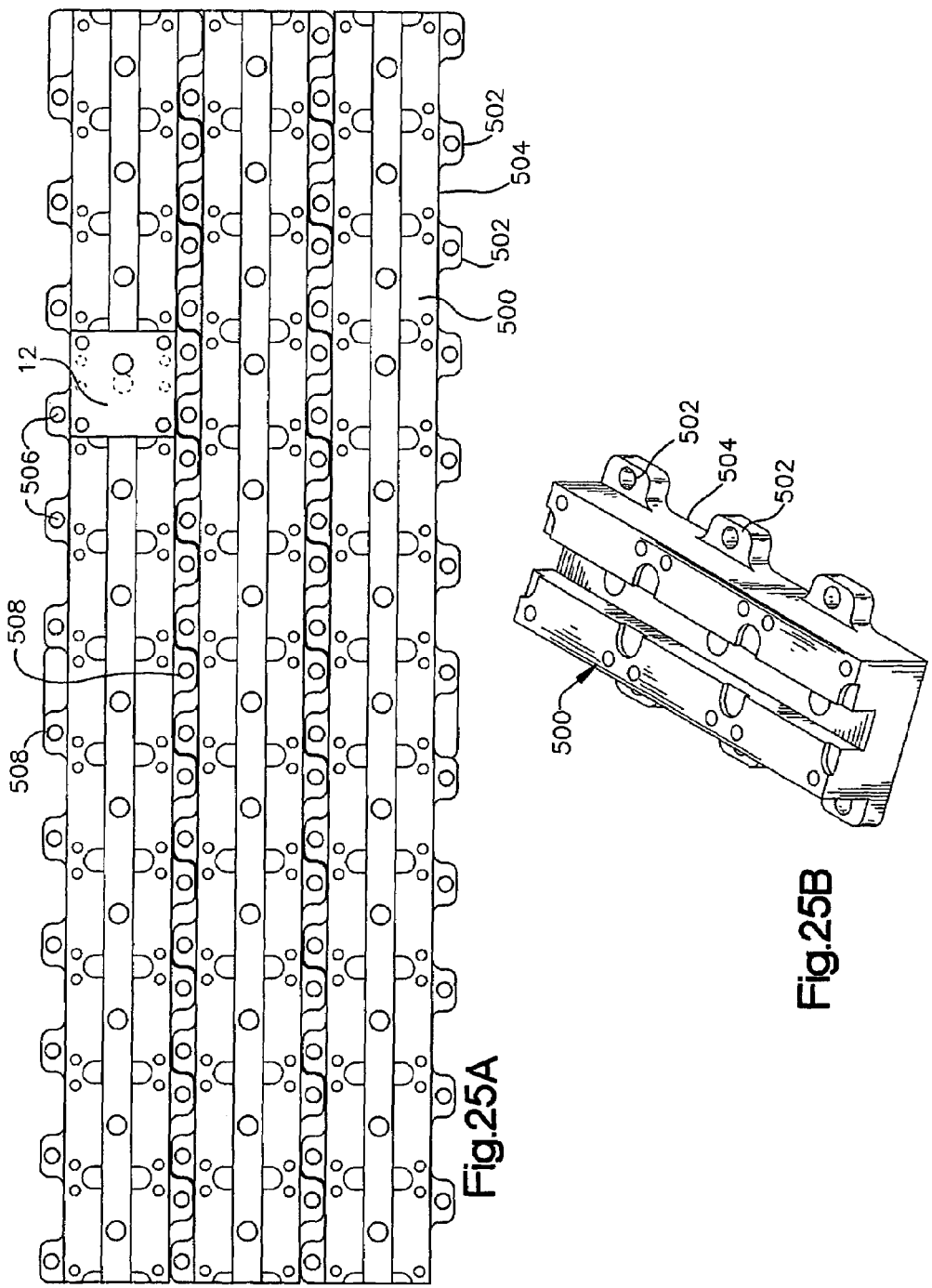

MODULAR SURFACE MOUNT MANIFOLD ASSEMBLIES

Field of the Invention

This is a continuation of U.S. patent application Ser. No. 10/154,154, filed May 23, 2002 now U.S. Pat. No. 7,048,007, for MODULAR SURFACE MOUNT MANIFOLD ASSEMBLIES, which is a divisional of U.S. patent application Ser. No. 09/544,020, filed Apr. 6, 2000 now U.S. Pat. No. 6,629,546, for MODULAR SURFACE MOUNT MANIFOLD ASSEMBLIES, which was a continuation of copending International patent application No. PCT/US99/10980 with an International Filing Date of May 18, 1999, which was published in English under PCT Article 21(2) designated the U.S., and which was a continuation in part of International patent application No. PCT/US99/04972 with an International Filing Date of Mar. 5, 1999, which was published in English under PCT Article 21(2) designated the U.S. This application further claims the benefit of U.S. provisional application No. 60/076,871 filed on Mar. 5, 1998, U.S. provisional application No. 60/085,817 filed on May 18, 1998 and U.S. provisional application No. 60/102,277 filed on Sep. 29, 1998, the entire disclosures of which are fully incorporated herein by reference.

BACKGROUND OF THE INVENTION

This application is a continuation of copending International patent application No. PCT/US99/10980 filed on May 18, 1999 and which designated the U.S. This application claims the benefit of International patent application No. PCT/US99/04973 filed on Mar. 5, 1999, U.S. provisional application No. 60/085,817 filed on May 18, 1998 and U.S. provisional application No. 60/102,277 filed on Sep. 29, 1998.

To manufacture semiconductors, the industry uses various high purity gases. These gases are controlled by systems made up of high purity valves, regulators, pressure transducers, mass flow controllers and other components connected together by welding and high purity metal seal fittings. These connections may be undesirable in some applications because they add additional time and cost for welding operations, unnecessary space between components and make it difficult to replace a component located between other components. Further, these systems are typically custom designed and manufactured which make the manufacturing costs and procurement of replacement parts quite expensive.

New modular manifold systems have been recently introduced into the industry in order to overcome these problems. Typical components of these systems such as valves, pressure regulators and other typical fluid components have been reconfigured so that their inlet and outlet ports and attachment mechanisms are compatible with surface mount manifolds. These manifolds are typically comprised of modular blocks which are machined of high purity metal and have machined internal flow passageways. These prior art modular systems typically utilize a metallic seal between the component and a modular block face, as well as face seals machined on the exterior sides of the modular block faces for sealing engagement with mating modular blocks. One objective of such systems is to use surface mount standard configurations based upon industry standards to permit interchangeability of surface mount components.

One disadvantage to these type of prior art modular systems is that the entire modular block is made of high purity metal. Further, these block components also have higher manufacturing costs due to the complexity of machining multiple passageways of a single block as well as a higher risk of expensive scrap being formed due to the manufacturing complexity. In addition, the mating blocks require the use of mating seals therebetween, which require additional manufacturing time, and further require proper installation and makeup torque of the fastener members in order to ensure a leak-tight seal.

SUMMARY OF THE INVENTION

Thus it is desired that a modular manifold design be provided which eliminates the seals between modular mating blocks, dramatically reduces the amount of expensive material utilized, and results in a simpler and less expensive system to manufacture while providing a reduced system footprint or envelope which meets or surpasses the performance, integrity and reliability of existing systems.

The invention provides in one aspect a bridge fitting for use in a fluid manifold system for being in fluid communication with one or more fluid components, such as valves, regulators, pressure transducers, mass flow controllers, and the like. The bridge fitting comprises a first elbow fitting connected to a second elbow fitting, with the connected elbow fittings having an internal fluid passageway therethrough. The internal passageway of the bridge fitting has an inlet end and an outlet end, with the inlet end in fluid communication with an outlet port of the first fluid component, and the outlet end of the bridge fitting in fluid communication with an inlet end of a second fluid component.

The invention provides in another aspect a bridge fitting for use in a fluid manifold system for being in fluid communication with three or more fluid components, wherein one or more of said fluid components has a single port. The bridge fitting comprises a first and second elbow fitting having a respective end connected to a tee fitting. The tee fitting is located between the elbow fittings, with each of the elbow fittings and the tee fittings having an internal fluid passageway in fluid communication with each other. The internal passageway of the fittings have an inlet end and a first and second outlet end, with the inlet end in fluid communication with an outlet port of the first fluid component, and the outlet ends of the fluid passageway being in fluid communication with an inlet end of a second and third fluid component, respectively.

The invention provides in yet another aspect a modular fluid manifold system for connecting with one or more surface mount type fluid components having an inlet port and an outlet port, the modular system comprising: one or more bridge fittings having an internal fluid passageway therethrough; the internal passageway of the bridge fitting having an inlet end for connecting to an outlet port of the first fluid component, and an outlet end for connecting to an inlet port of the second fluid component, whereby the internal fluid passageway of the bridge fitting is in fluid communication with the first and second fluid components when the system is assembled.

Still further, the invention provides a modular fluid manifold system for connecting with one or more fluid components comprising an inlet port and one or more outlet ports. The manifold system comprises one or more bridge fittings having an inlet end and an outlet end and an internal passageway joining said ends therethrough. The system further includes a locator plate having an upper surface for mounting the fluid components thereon and a plurality of holes aligned with the inlet and outlet ports of the fluid components. The locator plate has a lower surface for mounting the bridge fittings thereto. The inlet end of each of the bridge fittings are in fluid communication with an outlet port of a fluid component, and an outlet end of each of the bridge fittings are in fluid communication with an inlet port of another fluid component.

These and other features and advantages of the invention will become apparent in the detailed description and claims to follow, taken in conjunction with the accompanying figures.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 3B is a cross-sectional view of an alternative gas bridge incorporating a tee fitting and an additional tube section, in addition to the two elbows and the tube section shown in the complete gas bridge 8 illustrated in FIGS. 3 and 3a;

FIG. 5 is an exploded perspective of an alternative embodiment of the manifold assembly incorporating features of the subject invention;

FIG. 6 is a partial exploded, longitudinal cross-sectional view of two bridge fittings 50 and a corresponding sealing retainer 90 and mating fluid surface component of the assembly as shown in FIG. 5;

FIGS. 9 and 9A are perspective illustrations of two manifold substrates and a cross-purge channel;

FIGS. 10A–D illustrate various stages of assembly of two endwise connected substrates with FIG. 10D in cross-section;

FIGS. 11A and 11B illustrate an alternative embodiment for joining substrates used in a manifold assembly such as in FIG. 8;

FIGS. 15A, 15B and 15C illustrate a perspective, top and side view, respectively, of an alternate embodiment of the flow bridges;

FIGS. 16A–16C illustrate a perspective, top and side view of a drop down flow bridge;

FIG. 17 is a cross-sectional view in the direction 17—17 of the invention as shown in FIG. 14B;

FIG. 18 is a cross-sectional view in the direction 18—18 of the invention as shown in FIG. 14B;

FIGS. 20A, 20B and 20C illustrate a perspective, top and side view, respectively, of an alternate embodiment of the flow bridges;

FIG. 21 illustrate a perspective view of a multiport flow bridge shown in different sizes;

FIGS. 22A–22B illustrate a perspective and side view of a seal retainer, while FIG. 22C illustrates the seal retainer of 22A–B in use with a drop down flow bridge;

FIGS. 23A–23C illustrate a perspective and side view of an alternative embodiment of a seal retainer;

FIGS. 25A and 25B illustrate top and perspective views respectively of an alternate embodiment of the substrate manifold having tabular mounting flanges;

DETAILED DESCRIPTION OF THE INVENTION

Figure 1:
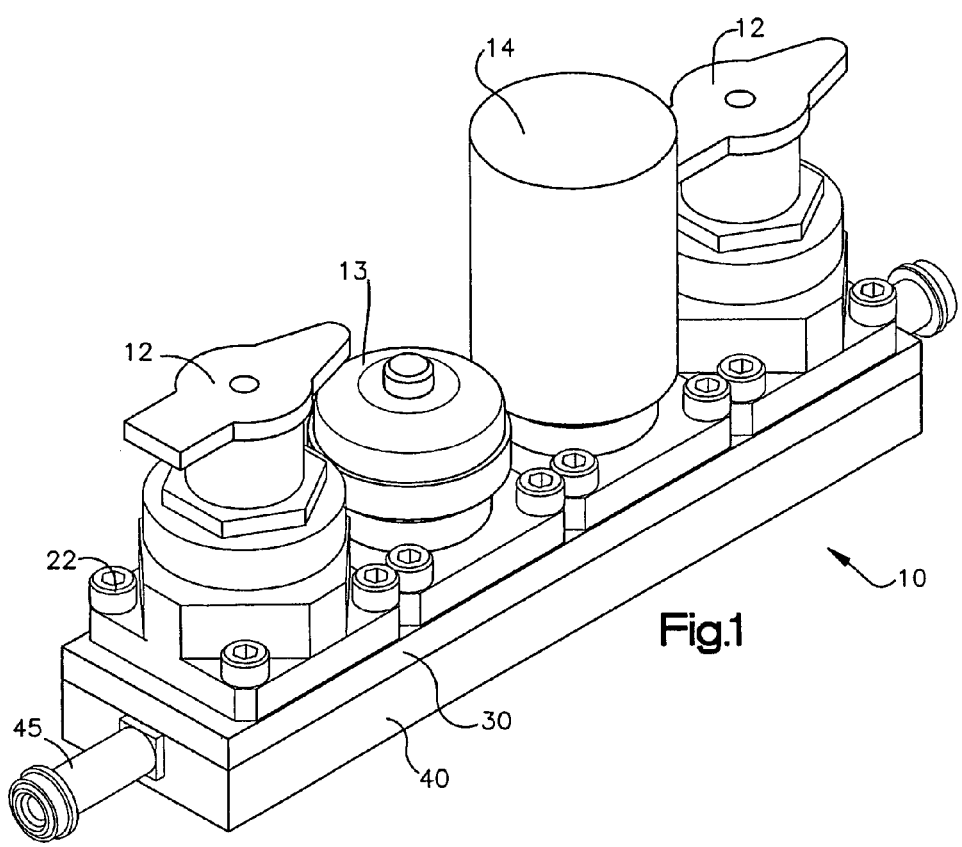
FIG. 1 is a perspective view of the complete manifold assembly shown with representative components and seals incorporating features of the subject invention.

Referring now to the drawings wherein the drawings are for the purposes of illustrating the preferred embodiments of the invention only and not for purposes of limiting same, a unique manifold system is shown in the FIGS. 1–30. The inventions as shown and described in the Figures are useful, for example, as part of a high purity modular gas distribution system used in the manufacture of semiconductor devices or other fluid systems which must withstand corrosive fluids. The present invention is not limited to the use in high purity fluid systems, and may be useful in any application relating to fluid flow control. Additionally, the various aspects of the present invention shown and described herein may be used separately or in various combinations as required for a particular application. Furthermore, although the preferred embodiments are described herein with reference to an exemplary modular manifold design, those skilled in the art will readily understand the invention can also be used in other modular system designs.

Figure 3:
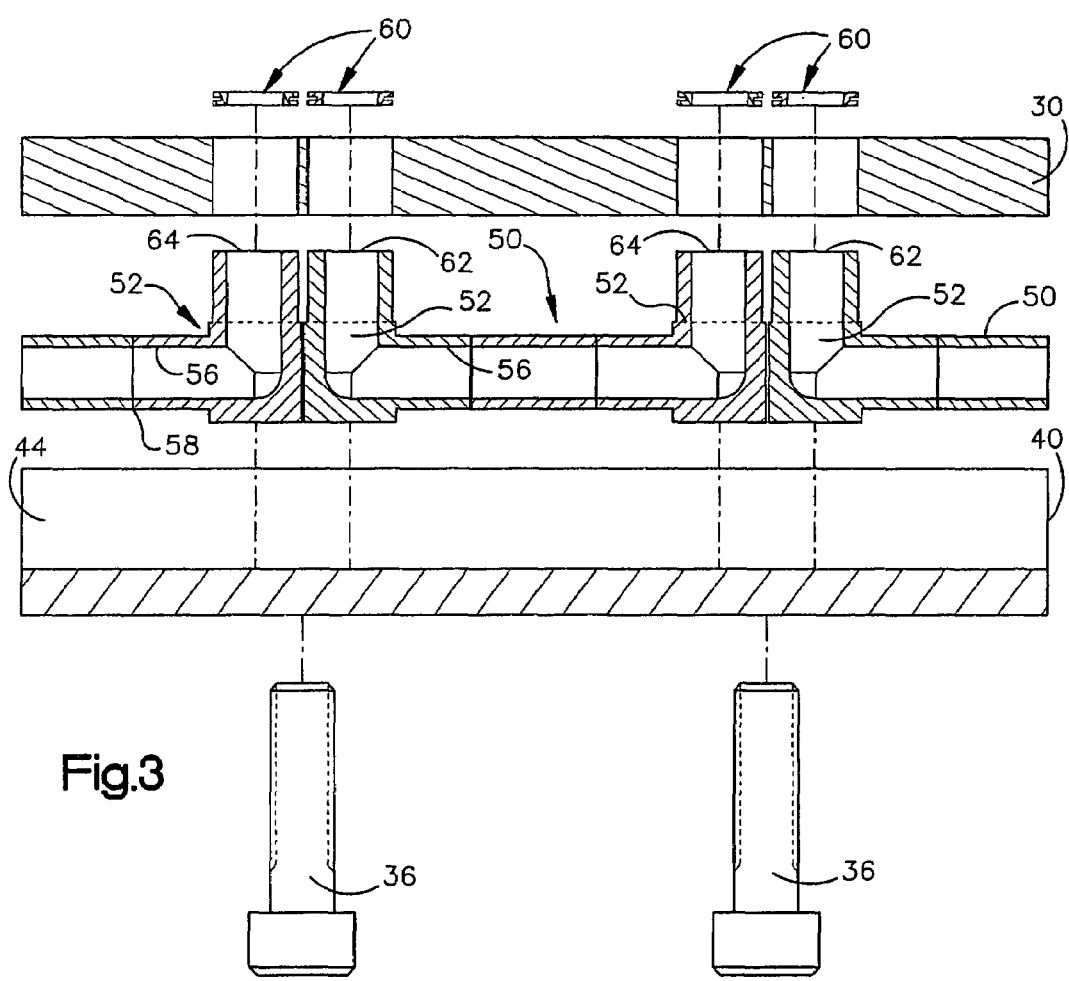
FIG. 3 is an exploded elevational view of a portion of the manifold of FIG. 2, showing one complete gas bridge located between two partially illustrated gas bridges and showing an optional representative seal.
Figure 3A:
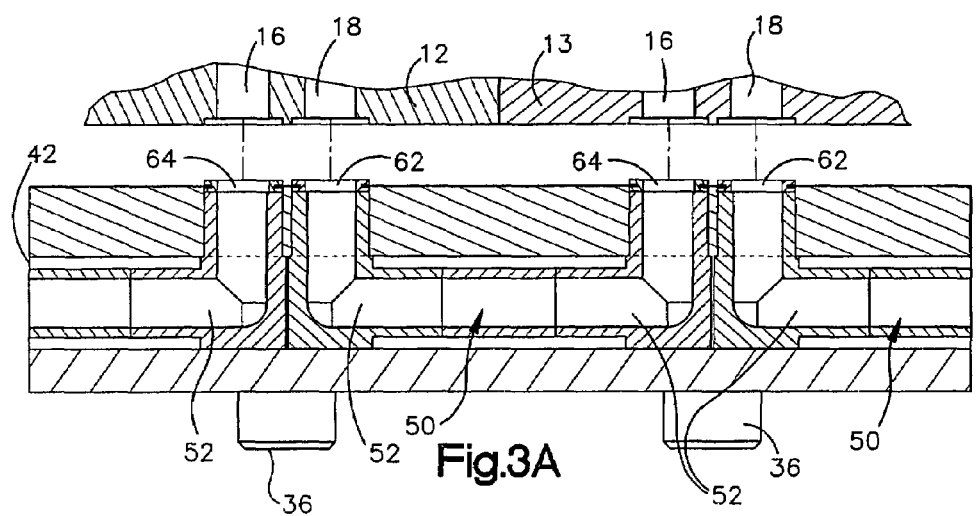
FIG. 3A is a cross-sectional view of the assembled manifold portion of FIG. 2.

Now referring to the drawings and more particularly FIG. 1, a modular fluid manifold system 10 is shown assembled together with fluid flow control components such as valves 12, flow regulators 13, filters 14 and the like. The fluid components may be utilized in conjunction with the invention, but are not part of the invention. The fluid components 12–14 are preferably surface mount type components, and each component has an inlet port 16 and may additionally comprise one or more outlet ports 18 as shown in FIG. 3A, which allow fluid communication to the fluid component. A series of fasteners 22 of the fluid components pass through openings 24 in the base flanges 26 of the fluid components in order to secure the components to the modular manifold system 10.

The modular manifold system 10 of the present invention may comprise one or more bridge fittings 50, an optional locator plate 30, an optional backing plate 40, optional end fittings 45, and optional sealing elements 60. These elements are described in more detail, below. The bridge fittings 50, as shown in FIG. 3, may be in the form of two elbow fittings 52 which are shown joined by an optional tubular extension 54 connected to the respective ends of the elbow fittings 52 by conventional means such as by welding. The elbow fittings 52 have an interior fluid passageway 56 having an inlet end 58 and an outlet end 62,64, with the inlet end 58 having a 90 degree orientation with respect to the outlet end 62,64. The optional tubular extension 54 has an internal fluid passageway which connects with the adjoining fluid passageway of the two adjacent elbow end fittings 52, such that a U-shaped fluid passageway is formed within the interior of the bridge fitting 50, with the passageway having an inlet end 62 and an outlet end 64.

As shown in FIG. 3A, the inlet end 62 of the bridge fitting 50 is in fluid communication with a respective outlet opening 18 of a fluid component 12, and the outlet end 64 of the bridge fitting 50 is in fluid communication with the inlet port 16 of an adjacent fluid component 13. Thus the bridge fitting 50, acts as a "bridge" to transfer fluid between adjacent fluid components such as 12,13 without the need for metal to metal seals between adjacent bridge fittings 50, which is typically required by the mating of adjacent prior art modular blocks. It is preferred that the bridge fitting 50 be comprised of stainless steel such as 316, hastalloy, semiconductor quality material ('SCQ'), or other material suitable for use in conjunction with semiconductor processing fluids. However, for typical industrial applications, any suitable material such as plastic or metal would work for the invention.

Moreover, the bridge fittings 50 are of a reduced dimension so that the amount of expensive material of the modular manifold can be substantially reduced. Prior art modular systems utilize modular manifold blocks, (with the surface mounted components thereon) made of expensive materials and which have the internal gas flowpaths integrally machined out of the manifold block. As the semiconductor industry moves toward standardization of modular gas system components, these modular manifold block components have a standard upper flange mounting surface area in order to mate with a standardized flange of a surface mounted flow component. Thus, the surface mounted flow components are readily interchangeable. Thus the prior art modular component blocks use a large volume of expensive material. The present invention provides a gas flow passage that is defined by a bridge fitting 50 which has a substantially reduced volume of expensive material as compared to the conventional prior art modular component blocks. This results in a more economic gas path manifold which is cheaper and easier to make than the prior art component blocks.

As shown in FIG. 1, the modular system 10 may also comprise end fittings 45, which comprise an elbow fitting having a 90 degree internal passageway connected to a standard fitting 46, such as a standard face-type fitting such as a Swagelok VCR® fitting (Swagelok Company, Cleveland, Ohio) or other suitable fitting for connecting with a fluid line. The end fitting 45 may be utilized as an inlet fitting or an outlet fitting which mates with the fluid line (not shown). Thus, the outlet or inlet end of the elbow fitting is connected to the respective inlet or outlet end of a fluid component. It is preferred that the end fittings 45 be comprised of stainless steel, 316 stainless, SCQ stainless or other material suitable for use in conjunction with semiconductor processing fluids, or the fluids of interest for a specific application. For typical industrial applications, the end fittings 45 may be comprised of any suitable material such as plastic or metal.

The modular manifold system 10 of the present invention may further optionally comprise a backing plate 40. The backing plate 40 may comprise a flat plate, but it preferably has an interior groove or channel 42 for receiving a plurality of bridge fittings 50 and end fittings 45 disposed therein. Each elbow fitting 52 of the bridge fitting 50 and the end fitting 45, has an exterior shaped body of an appropriate dimension which mates with the shape of the groove or channel 42 in order to prevent rotation of the bridge fitting 50 within the channel 42. It is preferred but not required that the external shape of the elbow fitting 52 be rectangular or square. It is also preferred that the internal side walls 44 forming the channel 42 have a suitable dimension for closely receiving a square shaped body, or that two of the opposed side walls have an appropriate dimension for receiving a rectangular shaped body. The invention is not limited to the above mentioned shapes, as any complementary shaped channel with respect to the shaped body of the elbow fitting 52 would work for the invention. The backing plate 40 may be comprised of any suitable material such as metal and metal matrix composites, but it is preferably made of a low-cost lightweight material such as aluminum. Non-mettalic materials may also be utilized depending on the application, such as plastic.

Figure 2:
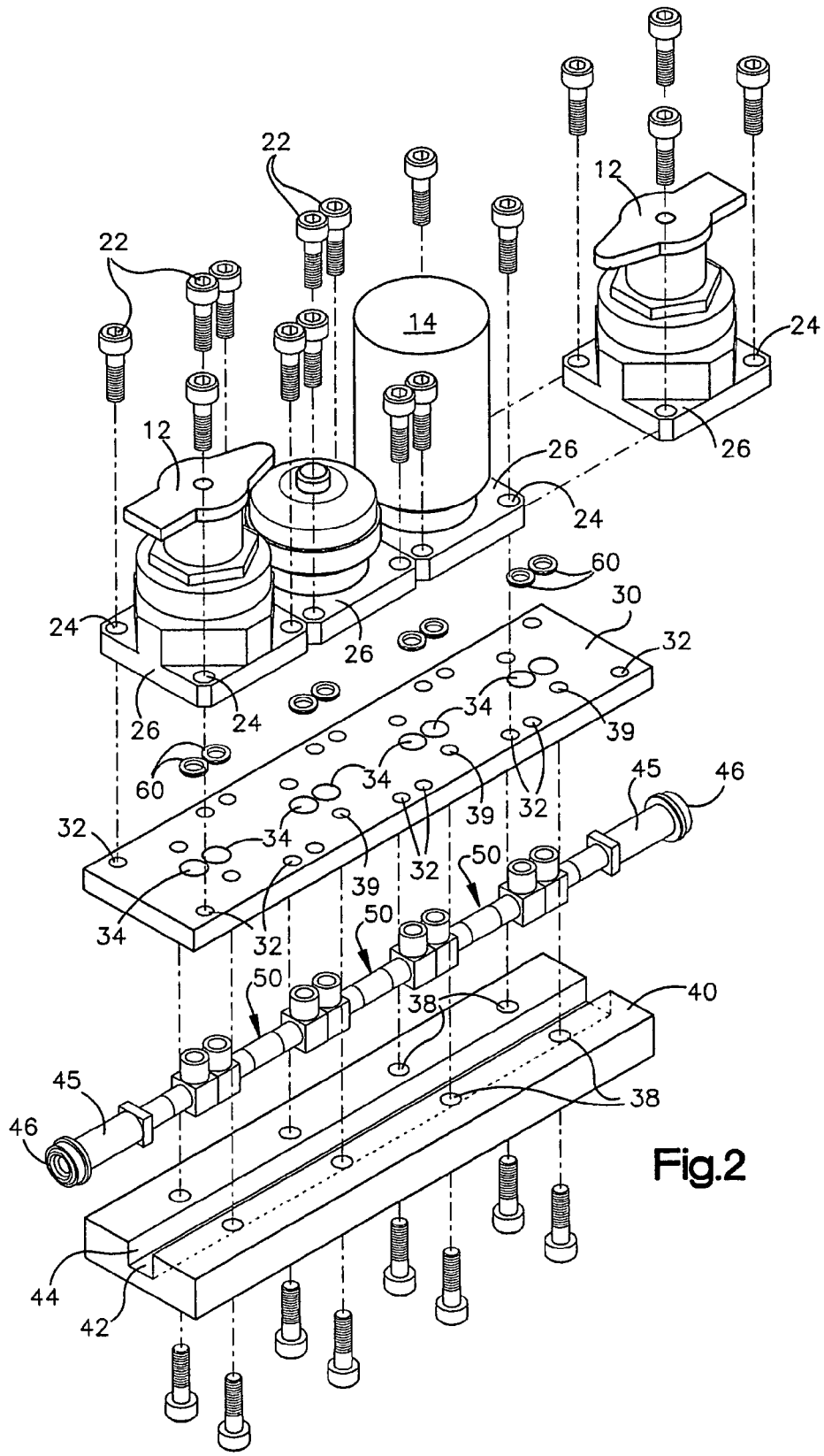
FIG. 2 is an exploded perspective of a manifold assembly and representative components and seals incorporating features of the subject invention as shown in FIG. 1.

It is preferable that the manifold system 10 further comprise seals 60, which are received between the mating inlet/outlet ports of the bridge fittings 50 and the fluid components. The seals 60 may be made of any suitable material such as elastomer, plastic, rubber or polymer material and preferably, a soft metal such as nickel. C seals may also be used, as well as composite seals to name additional examples. Other seal technologies which may used in conjunction with the invention will be readily apparent to those of ordinarily skill in the art. In a second embodiment of the invention as illustrated in FIGS. 2, 3 and 3A, an optional locator plate 30 may be utilized with the invention. The locator plate 30 has a plurality of holes aligned to receive the ends 62,64 of the bridge fittings 50 therein. The ends of the bridge fittings 50 are preferably slightly shorter than the thickness of the locator plate 30 such that a recess is formed for receiving a seal 60 therein. The locator plate 30 additionally has holes 32 aligned for receiving fasteners 22 therein. Thus in order to assemble the system pursuant to the second embodiment of the invention, the bridge fittings are placed within the channel 42 of the backing plate 40, and then the holes of the locator plate are aligned with the inlet and outlet end of the bridge fittings 50. The locator plate is then lowered into position such that the ends of bridge fittings 50 are inserted through the aligned holes 34 of the locator plate 30. Fasteners 36 are then inserted through aligned holes 38 of the backing plate for reception into aligned holes 39 of the locator plate 30. Lastly, the fluid components 12–14 are then secured to the locator plate 30 using fasteners 22.

Figure 3B:
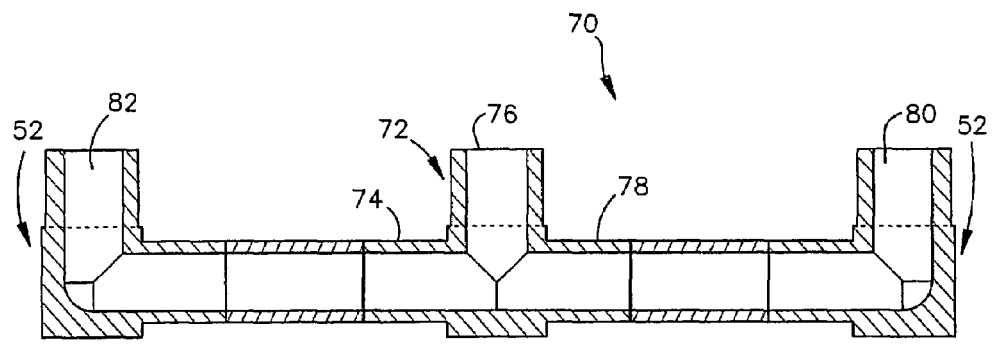

An alternative embodiment of a bridge-tee fitting 70 is shown in FIG. 3B. This bridge fitting 70 may be used in conjunction with three adjacent fluid components, wherein the middle fluid component has only one inlet port, e.g., a pressure transducer, or a flow diverter which redirects a portion of the fluid flow along another flow path. The bridge fitting 70 is comprised of two elbow fittings 52, each having an internal fluid passageway in fluid communication with a tee fitting 72. The tee fitting 72 has an inlet end 74, and two outlet ends 76, 78. Outlet end 76 of the tee fitting 70 is in fluid communication with the inlet of a single port fluid component such as a pressure transducer. The outlet end 78 of the tee fitting is in fluid communication with the outlet end 80 of the bridge tee fitting. Thus the bridge tee fitting 70 has an inlet end 82 and two outlet ends 76 and 80, and may be used to "bridge" or transfer the flow between three adjacent fluid components, wherein the middle fluid component has only a single port in fluid communication with the flow passage through the fitting 70.

Figure 4:
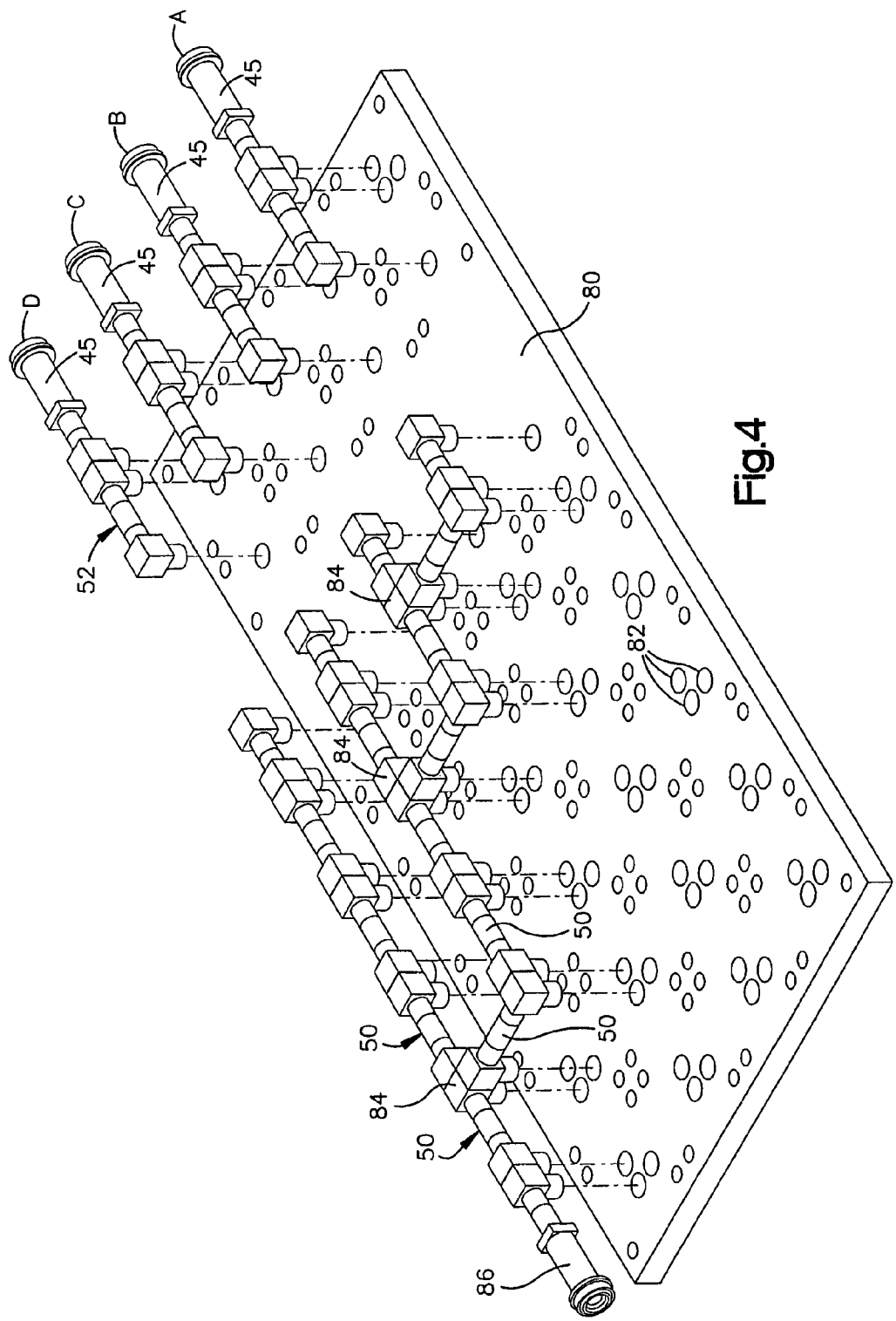
FIG. 4 is a perspective view of an alternative manifold system of the present invention which incorporates multiple flow paths extending in various directions.
Figure 5A:
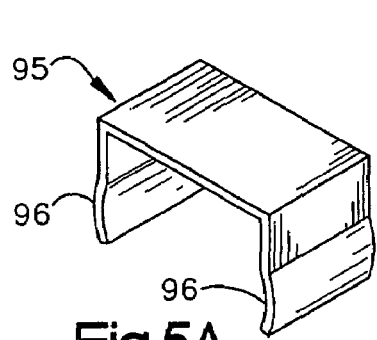
FIGS. 5A–D are perspective views of the retaining clips of the invention.
Figure 5B:
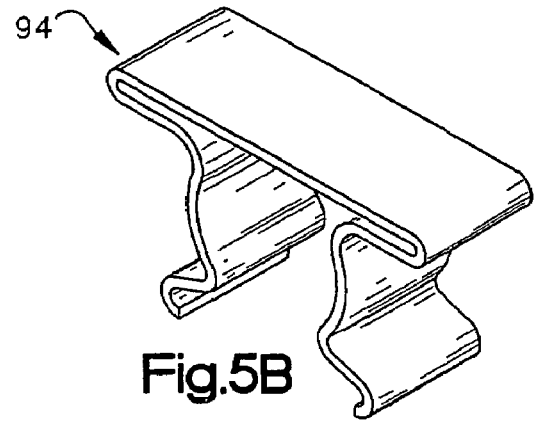
Figure 5C:
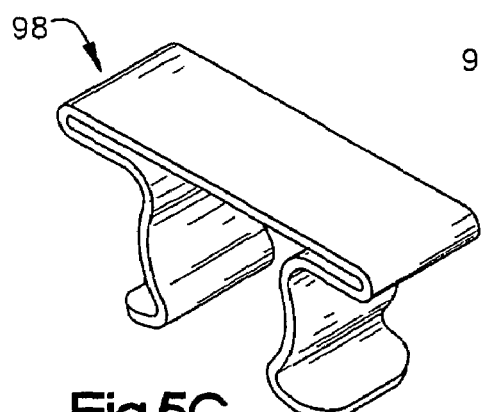
Figure 5D:
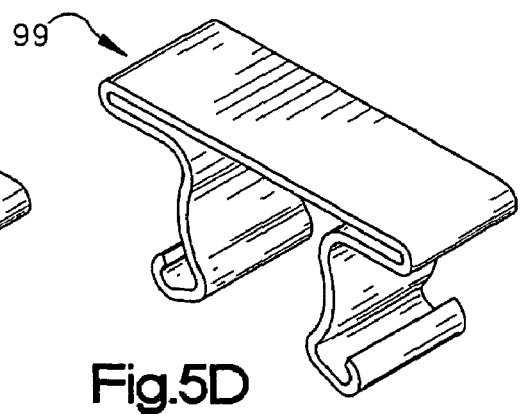

FIG. 4 shows yet another embodiment of a locator plate 80 designed for use with fluid flowing in multiple flow paths A, B, C and D. In order to better illustrate the invention, the backside of the locator plate is shown with respect to the bridges 50 (i.e., the opposite of FIG. 2). The arrangement of the bridges 50 within the holes 82 of the locator plate allow for the combination or mixing of fluids from one or more flow paths. Thus as shown in FIG. 4, four independent flow paths are shown (A, B, C and D) which are mixed together in desired proportions by fluid components (not shown) which result in the fluid outlet 86 of the system to be comprised of the fluids A, B, C and D mixed in a desired proportion. This is accomplished by using a fluid component such as a valve having a three port configuration (at locations 84) in order to allow for the mixture of the different fluids from separate flow paths. Note that the bridge fittings 50 are combined in a "pegboard" style arrangement in order to achieve the desired result as described above. Thus bridges 50 are used to inter-link or join the separate flow paths in order to achieve the fluid mixing, without the need for any specially adapted components. This is a distinct advantage over prior art block type modular designs, as a special block having three ports would be needed.

In this embodiment of the invention, the locator plate 80 may be used both as a support for the bridges 50 and as a "locator" without the need for a support plate. The bridge fittings 50 may further comprise a threaded end (not shown) which can be inserted into aligned threaded holes 82 of the locator plate 80. The ends 62,64 of the bridge fittings 50 may also be press fit into the aligned holes 82 of the locator plate 80 or be attached by retainer clips (not shown) to the locator plate. Other attachment means may be readily apparent to those ordinarily skilled in the art.

In this embodiment of the invention, the ends 62,64 of the bridge fittings 50 may vary in height, with a height sufficient to allow multiple layers of bridge fittings (not shown). This cross layer feature would be useful, for example, if it were desired to provide purge gas in Line A to the other gas lines B, C and D. In order to accomplish this, a modified bridge fitting 50 would be needed which would additionally comprise a tee fitting for mating with the bridge fitting of an upper layer. The tee fitting would be located between the elbow fittings as shown in FIG. 3B, and have an internal fluid passageway in communication with the internal fluid passageways of the elbow fittings. However, unlike FIG. 3B, the opening of the tee fitting would be 180 degrees opposite of the openings of the elbow fittings in order to mate with the tee fitting of a bridge fitting located in another layer. Thus this embodiment of the invention would result in a fluid manifold system having multiple fluid flow paths, with said paths being capable of extending in multiple directions. Further, this embodiment allows for multiple or three dimensional layering of gas flow paths, wherein the fluid flow paths of one layer may be in fluid communication with the fluid flow path of another layer(s).

In yet another alternative embodiment of the invention as shown in FIGS. 5 and 6, the optional locator plate 30 has been eliminated. In place of the locator plate 30, seals 60 are held in place by optional flexible retainers 90 which are made from a thin flexible material such as plastic or metal. These retainers 90 are commercially available by EG&G, Inc. Holes 92 of the retainer 90 align to receive fasteners 22 which are received within holes 32' of the backing plate or channel block 40. Seals 60 such as c-seals are held in place by one or more support members 92. The seals 60 are precisely positioned within the retainer 90 such that when holes 92 align with the fasteners 22, the seals 60 precisely align with the inlet 16 and outlet 18 of the fluid components 12,14, and the respective outlet 64 and inlet 62 of the adjacent flow bridges 50. The flow bridge fittings 50 have been modified such that the vertical tubular extensions have been eliminated, such that when the flow bridges 50 are positioned within the channel, the inlet and outlet ends 62,64 are flush or slightly recessed with respect to the upper surface 43 of the channel block 40. In addition, FIG. 5 shows a different shape of the elbow fittings 52 which form the flow bridge 50. The elbow fittings 52 are shown having a rectangular shaped body with the internal fluid passageway being machined such that the inlet end is approximately at about a ninety degree orientation with respect to the outlet end. Preferably, the inlet and outlet ports 62,64 of the flow bridges 50 additionally comprise a circular recessed area about the ports for receiving a seal 60 partially therein.

As shown in FIG. 5, after all the elbow fittings 52 are secured together to form a flow bridge 50, the flow bridges are placed in the channel of the backing plate 40. Optional retaining clips 95 may be received about each flow bridge in order to retain the bridges within the channel. The retaining clips 95 may be inserted about each flow bridge 50 in, for example, the necked down regions defining the welded interconnection between adjacent elbow fittings 52. The retaining clips 95 as better shown in FIG. 5A, are preferably a U-shaped configuration having parallel curved legs 96 having a wider spacing than the channel width, which results in a spring-like characteristic. Thus, when the parallel legs 96 are inserted around the flow bridge 50 within the channel, the flow bridges are retained within the channel due to the legs frictionally engaging with the sidewalls of the channel due to the spring force of the legs 96. Additionally, alternative embodiments of the retaining clip 97,98 and 99 are shown in FIGS. 5B–D.

Figure 7:
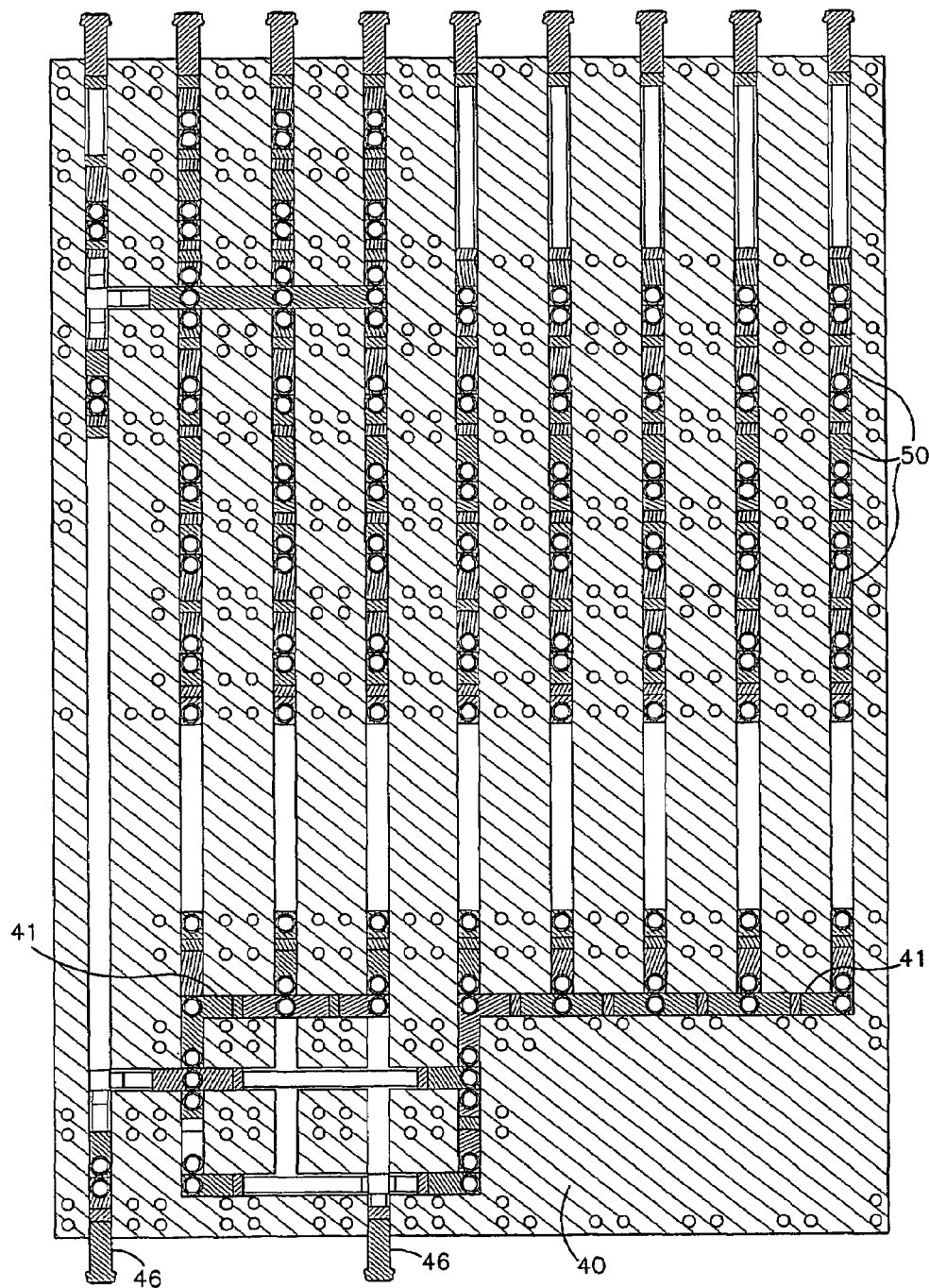
FIG. 7 is a plan view of a more complex fluid system including multiple fluid lines.

As may be further appreciated, the backing plate or channel block 40 as shown in FIG. 7, may further include a plurality of channels 42 with flow bridges 50 positioned therein for transporting the fluid flow of aligned flow components in a first direction, and one or more interlinking transverse or branch channels 41 with flow bridges positioned therein for transporting fluid in a second direction. Thus multiple flow paths are formed which allow the intermixing of fluid across different flow lines. The branch channels 43 preferably extend transversely across the channels 42 in the first direction to other adjacent channels 42. This would be useful, for example, in fluid systems which require purge air or fluid streams mixed together.

Figure 8:
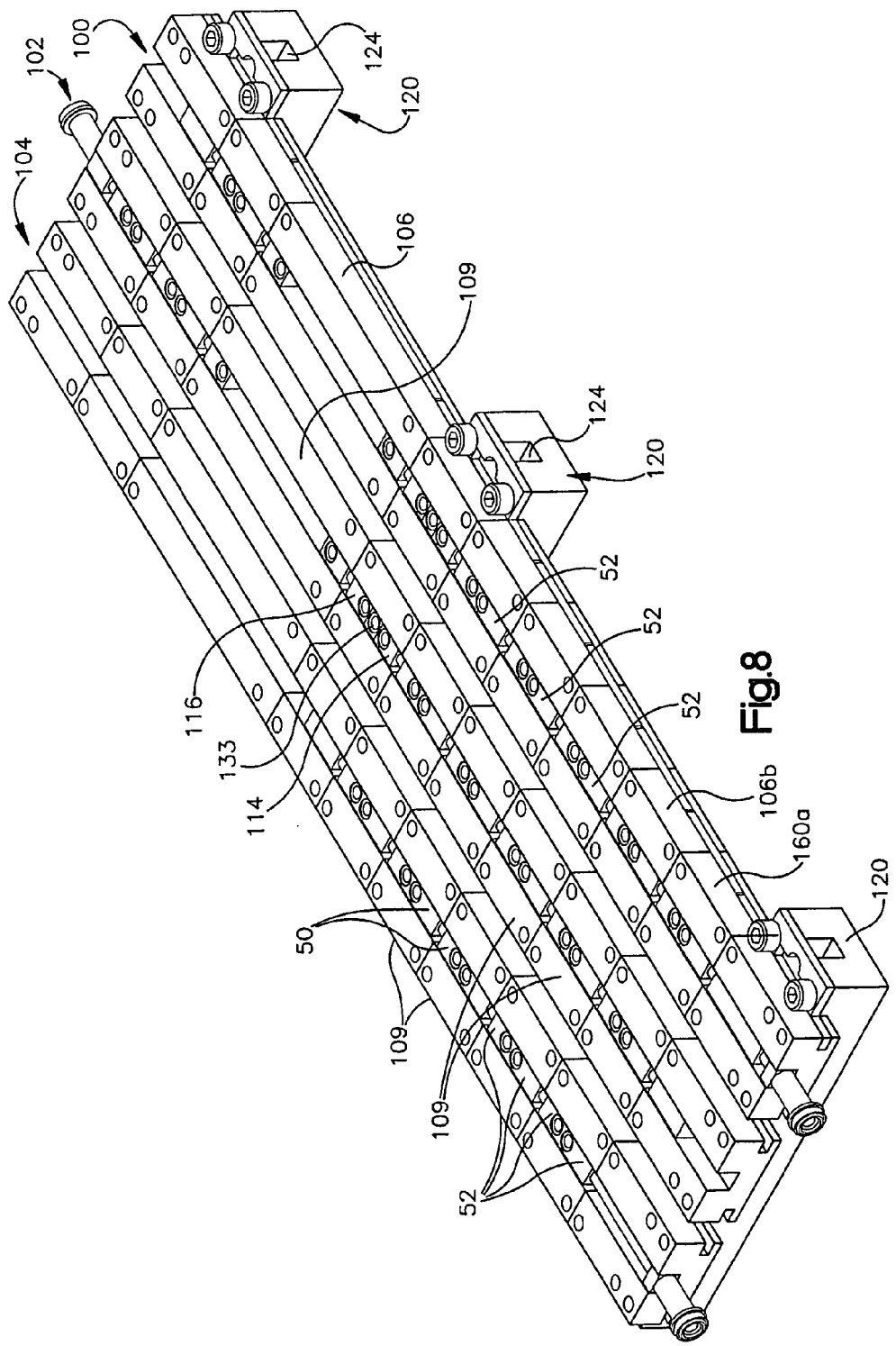
FIG. 8 is a perspective illustration of another embodiment of the manifold assembly of FIG. 1 using a plurality of flow channels in an upper and lower substrate level.

With reference next to FIG. 8, in accordance with another aspect of the invention, a cross-purge feature is illustrated for a manifold arrangement that uses a plurality of flow channel manifolds. The basic components of each of the flow channel manifolds may be as described herein with respect to the above described embodiments, with some modification as will be described herein shortly.

In FIG. 8, three flow channel manifolds 100, 102 and 104 are provided. Each manifold is similar to the others in terms of its basic structural components, therefore only one manifold will be described herein in detail. In this embodiment, the three manifolds 100, 102, 104 are aligned generally parallel and coplanar with each other. By way of example, the first flow channel manifold 100 includes a series of substrate structures 106 joined end to end to form a gas stick manifold. The other manifolds 102 and 104 include substrates 109, again of various available flow path configurations. Each substrate 106 is illustrated in an exemplary manner in FIG. 9. In this case, each substrate 106 is at least large enough to have a surface mounted component 10 mounted thereon. Alternatively, various ones or all of the substrates 106 can be lengthened to allow more than one surface mounted component to be mounted thereon, as for example, the embodiment illustrated in FIG. 5. Yet a further alternative would be to have a single substrate 106 of sufficient length to accommodate all the required surface mounted components for a specific gas stick.

With reference to FIG. 9, two substrates 106,109 are shown that lie adjacent each other, each substrate being from one of adjacent pairs of the manifolds 100, 102, or 104 of FIG. 8. Each substrate structure or assembly 106 is similar in some respects to the basic substrate structure illustrated in FIG. 5 in that the substrate 106 includes a channel block 108 with a channel 110 formed therein. At least one flow bridge 50 formed of one or more flow bridge blocks 52 is closely received in the channel 110 and can be secured therein by a clip 95 if needed (not shown). As shown in FIG. 5, the flow bridge 50 includes two ports 62,64 that align with inlet and outlet ports 16,18 of a surface mounted flow control device (not shown) when the flow control device is mounted on the substrate 106.

Seals such as C-seals 50 can be used to form fluid tight connections between the device ports 12, 14 and the bridge block ports 114, 116 as in the earlier described embodiments. As further described herein before, the flow bridge blocks 30 of endwise adjacent substrates (for example 106a and 106b in FIG. 8) can be welded together using tube extensions.

In accordance with the invention, the channel block 108 is preferably made of a low cost lightweight material such as aluminum, while the flow bridge blocks 30 which conduct the semiconductor processing gases are made of the more expensive semiconductor quality steel. As illustrated in FIG. 9, the three gas stick manifolds 100, 102 and 104 may be mechanically joined or interconnected together as a single assembly by one or more crosswise arranged purge channels 120. In this embodiment, the cross-purge channels 120 lie generally parallel and coplanar with each other and are mounted to the undersides of the manifolds 102, 104, 106. The purge flow channels can be used, for example, to supply purging gas to each of the gas stick manifolds 100, 102, 104.

Each purge channel 120 may be machined from a low cost metal block such as aluminum or non-SCQ stainless steel. The purge channel 120 may include recesses 122 that receive respective substrates 106 to simplify alignment during assembly. The purge channel 120 has a longitudinal recess 124 formed therein that closely receives a number of purge bridge blocks 126 joined end to end by tube extensions joined by welding, for example. The purge bridge blocks 126 can be made and interconnected substantially similar to the flow bridge blocks 50. A purge port 128 is provided in the purge block 126 that is in fluid communication with a purge port of a surface mounted component 10 (not shown in FIG. 9) via a conduit 130 having a straight through flow path that is mounted through a hole in the above-mounted substrate 106. An adapter or transition tube block 132 may be used to provide a purge port 133 for connection to the surface mounted component 10 as needed. As shown in FIG. 9, the transition tube 132 may be used in combination with two bridge fittings 50, for example, to provide purge gas to a three port valve. Thus the one end of the bridge fittings located on either side of the transition tube 132 form three adjacent ports 114, 133, 116, wherein 133 is the purge port. The other ends of the bridge fittings 50 were omitted from FIG. 9 for clarity.

Suitable seals such as C-seals can be used to provide fluid tight connections between the purge block 126 and the conduit 130 as well as between the conduit 130 and the transition block 132 and/or the surface mounted component purge port. Retaining clips 95 as shown in FIGS. 5A–D can be used to hold the purge blocks 126 in the longitudinal recess 124 especially during shipping. The transition tube 132 may be disposed within the channel 110 so as to align with the flow control device 10 purge port when the device 10 is mounted on the substrate 106. In the embodiment of FIGS. 5 and 8, the purge port is located in the middle area between the inlet and outlet flow ports.

With reference to FIGS. 10A–D, each substrate 106 includes longitudinal slots 140a and 140b formed on opposite sides of the substrate near the bottom wall 142 of the substrate. In this exemplary embodiment, the slots 140 extend the full length of the substrate although this is not required. The slots only need be long enough to accommodate a connector strap as will be described herein. Each substrate 106 further includes a plurality of threaded screw holes 144, preferably one at each corner of the substrate 106, that extend down through the substrate at least to the slots 140.

Two substrates 106a and 106b are joined end to end by connector straps 146, in this example, a pair of connector straps 146a and 146b. About half of each connector strap 146 is slideably received in a respective end portion of the adjacent slots 140 of the two substrates 106a and 106b. In this example, the first connector strap 146a fits into the slot 140a of the first substrate 106a and the corresponding slot 140a of the second substrate 106b. The connector straps 146 are preferably no wider than the slots 140 so that smooth side wall contours of the substrates are maintained. The connector straps 146 are provided with holes 148 that generally align with the screw holes 144. Threaded set screws 150 can be screwed into the holes 144 and are of sufficient length to also screw into the holes 148 in the connector straps 146. However, in order to securely hold the substrates 106a and 106b together, the connector strap holes 148 are preferably formed with a slight offset in their spacing, for example 0.020 inches, compared to the spacing of the set screws 144 when the substrates 106a and 106b are abutted endwise. As the set screws 150 are screwed into the connector strap holes 148, the substrates 106a and 106b will be pulled up tightly together as in FIG. 10D.

With reference again to FIGS. 8 and 9A, some of the substrates 106 are also connected to the cross-purge channels 120. The cross-purge channel 120 includes threaded holes 152 that receive mounting bolts 180. In the exemplary embodiment, the substrates that overlay the cross-purge channel 120 are provided with a mounting strap 182 that includes an outwardly extending flange 184. The flange 184 includes through holes that align with the purge channel holes 152 such that the bolts 180 secure the substrate 106 to the cross-purge channel 120. Since the plurality of substrates 106 in a single gas stick are also interconnected via the connector straps, the entire assembly of FIG. 8 is a rigid assembly securely held together. In the alternative embodiment of FIG. 11A, when the connector pins 164 are used, the substrate 106 is provided with the flange 172 and corresponding holes that align with the purge channel holes 152. Thus, the bolts 180 secure the substrate to the purge channel 120.

With reference to FIGS. 11A and 11B, an alternative embodiment is illustrated for interconnecting the substrates 106 endwise. In lieu of the slots 140 each substrate 106 is provided with longitudinally extending bores 160 at adjoining faces of the substrates (106a and 106b in the illustration of FIG. 11) and on either side of the flow bridge receiving channel 110. Round pins 162 are snugly received in the bores 160. Each pin 162 extends into corresponding and aligned bores 160 to join the substrates 106a, 106b together. Each pin 162 may also include notches 164. Set screws 166 can be screwed into engagement with the pins 162 at the notches 164, as through aligned screw holes 168. When each screw end 170 engages a corresponding pin notch 164, the pin 162 is securely held within the substrate body 160. The axial spacing of the notches 164 relative to the spacing of the screw holes 168 can be offset to cause the substrates to be pulled together as the screws 166 are tightened down. In this embodiment, the substrates 106 are provided with base extension lips 172 to secure the substrate to a cross-purge channel 120 as with bolts (not shown in FIG. 11, but see FIGS. 9 and 9A).

Figure 12A:
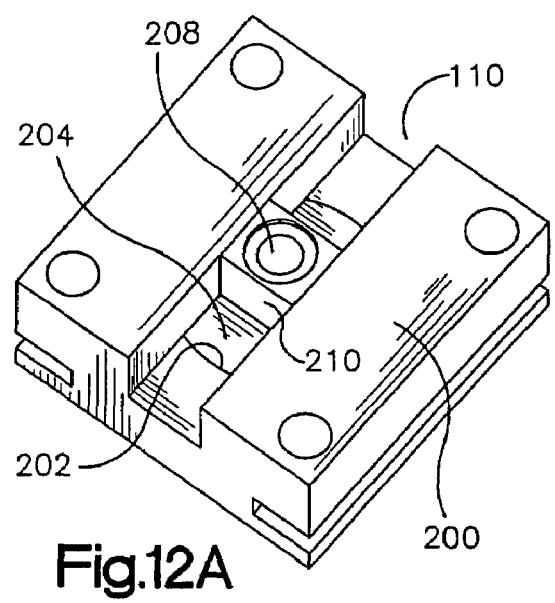
FIGS. 12A and 12B illustrate a substrate with a check valve mounted therein.
Figure 12B:
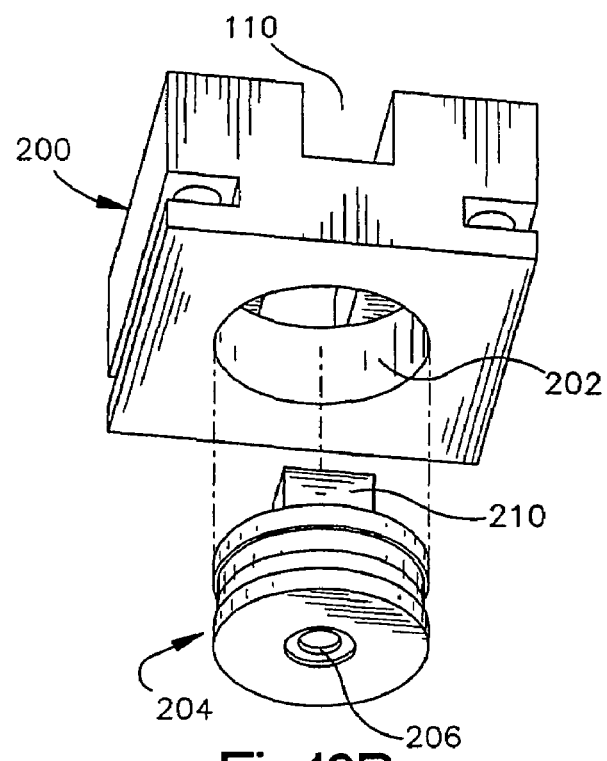

FIGS. 12A and 12B illustrate another aspect of the invention. In this embodiment, a substrate 200 such as one of the substrates used in the gas sticks in FIG. 8, is modified to include a central opening 202 that is open to the flow block recess 110 in the substrate. A check valve assembly 204 is inserted into the opening 202. The check valve includes an inlet port 206 and an outlet port 208. As best illustrated in FIG. 12A, the check valve 204 includes a flow block 210 that inserts into the channel 110. Additional flow blocks 30 (not shown) can be inserted into the recess 110 on either side of the check valve block 210. The check valve 204 can be used for example to check purge gas flow. In such an example, the check valve block 210 would replace the transition block 132 (FIG. 9).

Figure 13:
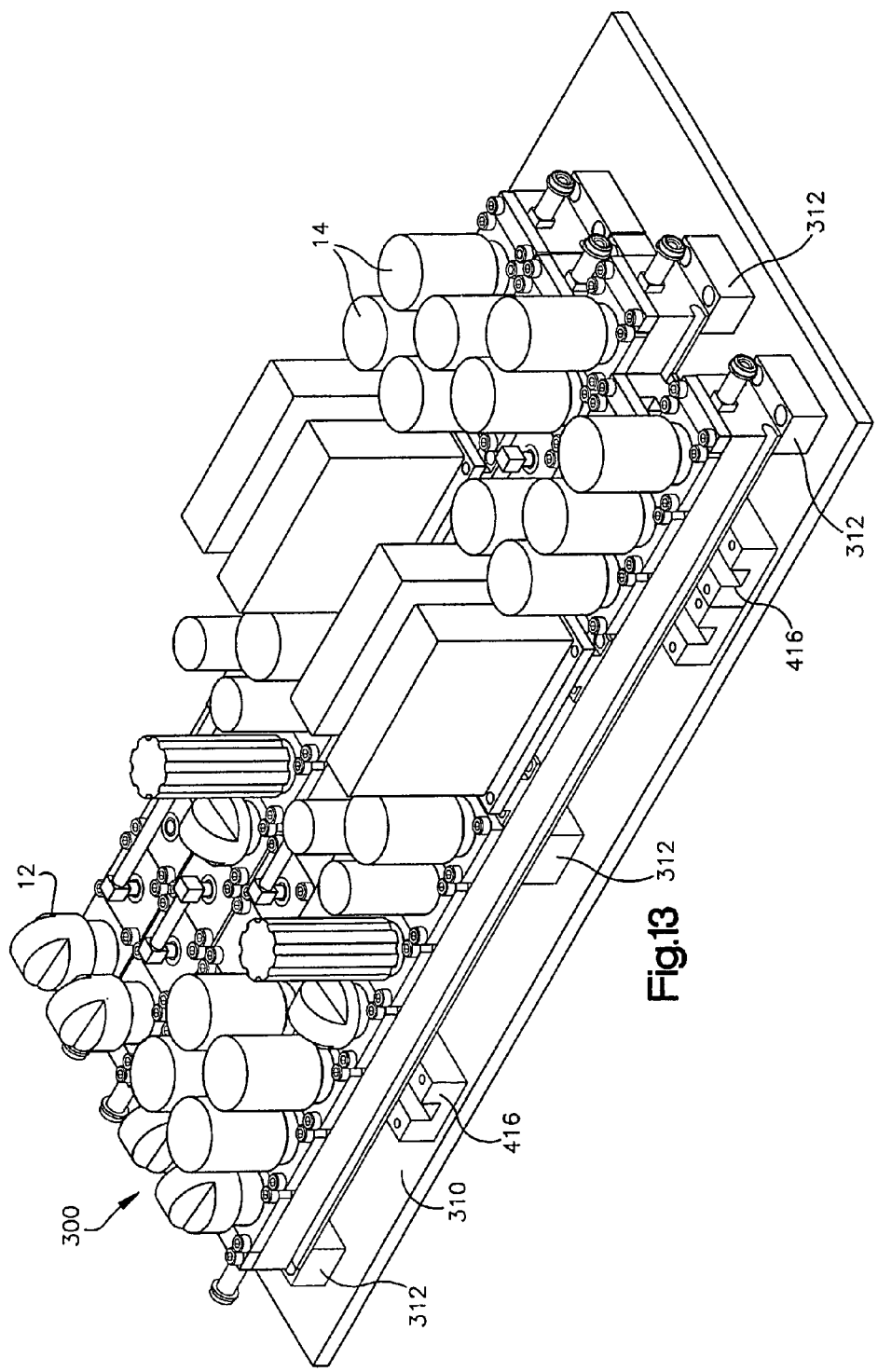
FIG. 13 is a perspective view of yet another embodiment of a manifold assembly of the present invention.
Figure 14A:
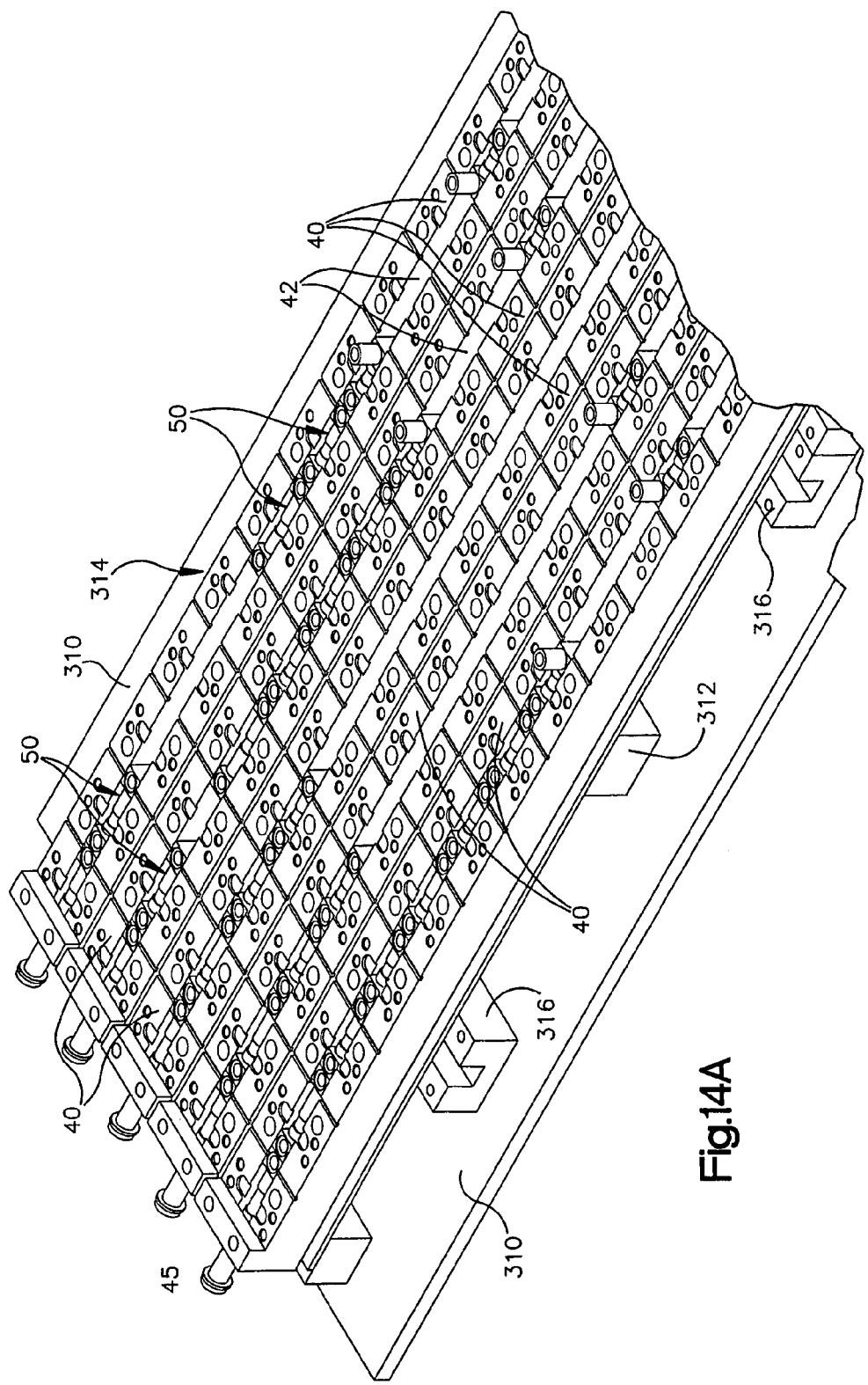
FIG. 14A is a perspective view of the invention of FIG. 13 shown with the flow components removed from the manifold assembly.
Figure 14B:
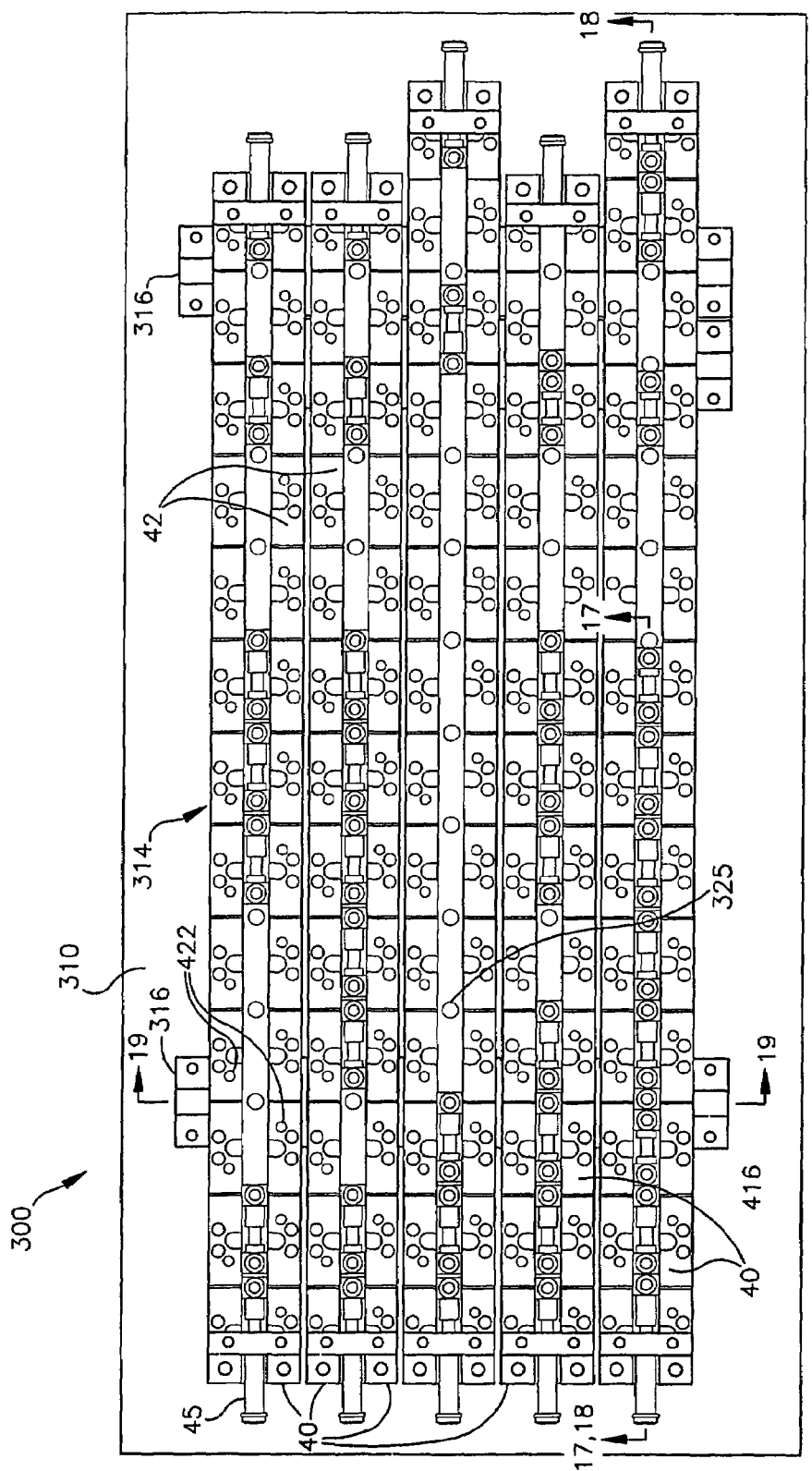
FIG. 14B is a top view of the invention as shown in FIG. 14A.
Figure 19:
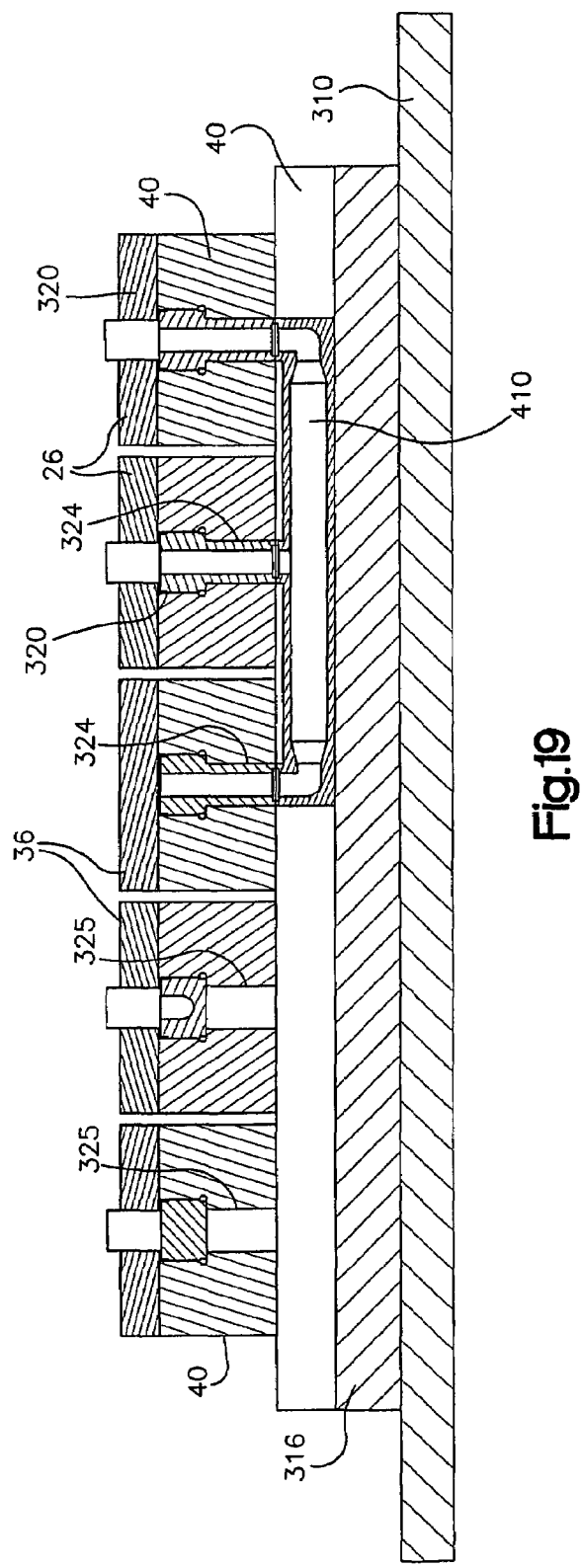
FIG. 19 is a cross-sectional view in the direction 19—19 of the invention as shown in FIG. 14B.

With reference next to FIG. 13, in accordance with another aspect of the invention, a multi-level manifold arrangement 300 is illustrated for direction fluid in multiple flow paths in two or more planes. The basic system components may be as described herein with respect to the above described embodiments, with some modification as will be described herein shortly. The manifold system 300 comprises an optional base plate 310 and optional support blocks 312 for allowing the system to be assembled prior to installation. As shown in FIGS. 14A, 14B and 15 with the flow components removed, the system comprises an upper substrate layer 314 and a lower substrate layer 316. The upper substrate level 314 comprises a plurality of channel blocks 40 which may be of varying lengths and may further be closely spaced in a parallel orientation as shown. The channel blocks 40 may be secured to the support blocks 312 by fasteners, and the support blocks 312 may in turn be fastened to the support plate 310.

Positioned within each channel 42 of the channel blocks 40 are the flow bridges 50 as best shown in FIGS. 15A–15C, and 16A–C. As shown in FIG. 15A, another embodiment of the flow bridge 50 comprises two square shaped elbow fittings 52 having tubular extensions joined together to form a U shaped flow passage. The outer surface of the inlet and outlet ports of the flow bridge 50 are preferably flush or slightly recessed below the upper surface 43 of the channel block 40. The inlet and outlet ports 62,64 of the flow bridges 50 have a recessed region for receiving a seal 60 partially therein, such that a seal is maintained between the ports 64,62 of the flow bridges and the mating ports 16,18 of the flow components 12–14.

As shown in FIGS. 16A–C, a drop down bridge 320 is shown for use in allowing fluid communication between adjacent flow components in the upper substrate level, and a flow bridge or multiport flow bridge 400 (See FIG. 21) in the lower substrate level. As shown in FIG. 16A, the drop down bridge 320 is comprised of an elbow fitting 52 and a tee fitting 322 having a tubular extension 324 of a sufficient length such that the inlet port 326 is in fluid communication with an aligned port of a flow bridge 50 or multiport flow bridge 400 in the lower substrate level 316. The drop down bridge 320 further comprises two upper substrate level 314 ports 328,330, and a lower substrate port 326. Ports 328,330 have a recessed circular area 332 for receiving a seal such as an o ring, metal washer, C seal or other elastomer/polymeric seal know in the art. The drop down bridge 320 is positioned within the channel of the channel block 40 such that the tubular extension 324 is received within the hole 325 (See FIG. 14B) of the channel wall 42. Port 326 of the tubular extension is shown in fluid communication with a multiport flow bridge 400 in FIG. 19.

Figure 24A:
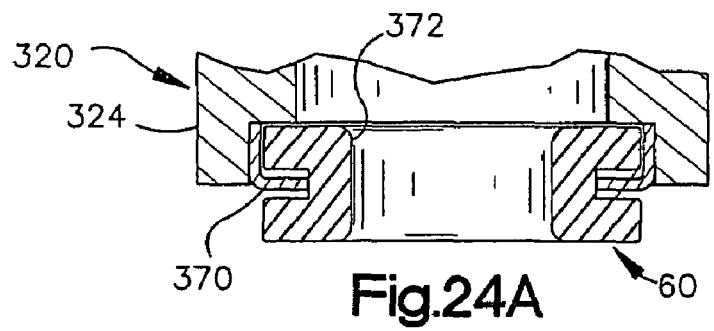
FIGS. 24A–24C illustrate a perspective and side view of additional alternative embodiments of a seal retainer.
Figure 24B:
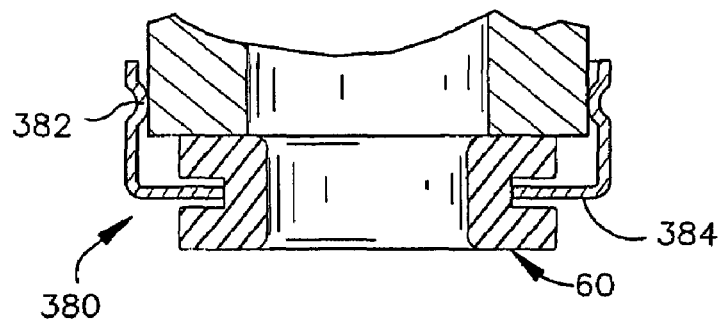
Figure 24C:
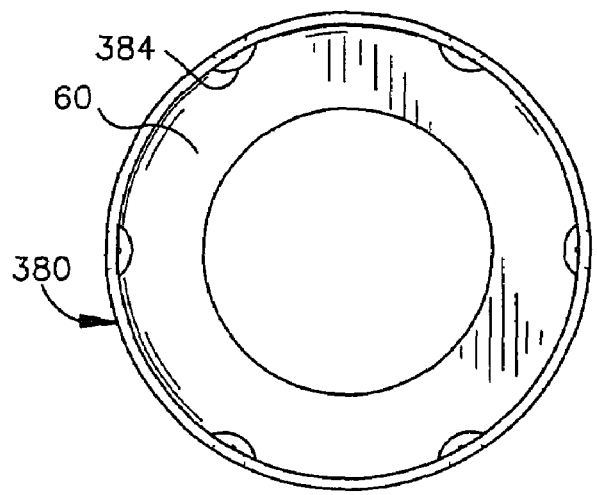

The ports 326,328,330 of the drop down bridge 320 may function as either inlet or outlet ports depending on the direction of flow. For example, if a multiport flow bridge 400 of the lower substrate level 316 is used to provide purge gas up to the flow components 12–14, port 326 will act as an inlet port, while ports 328,330 will act as outlet ports in order to provide purge gas to the adjacent flow components. Another example would be that one of the ports 328,330 would be connected to a flow component two-way valve 12, such that fluid could be directed to either the upper or lower substrate levels 314,316 depending upon the valve setting and the direction of the flow. Thus the design of the drop down bridge 320 will allow the gas flow to travel in either direction, i.e., from one substrate layer to another. An alternative embodiment of the drop down bridge 320 would be the transition tube 132 as described above, in which a straight through flow path is utilized. This design is most useful in combination with a three-way valve and two adjacent flow bridges 50. The transition tube 132 may be connected to the middle port of the valve for providing purge gas to the valve from the lower substrate level. In order to facilitate the sealing between the port 326 of the drop down bridge 320 and the ports 16,18 of a flow bridge 50 located within the lower substrate level 316, optional drop down clip 350 may be used as shown in FIGS. 22A–C in order to retain the seal 60 in a sealing relationship with the port 326. The drop down clip 350 facilitate proper location of the seal 60 between the mating ports. The drop down clip 350 comprises a flexible C shaped flange which is received upon the flange 352 of the drop down bridge 320. Optional cutouts 354 allow for greater flexibility in installing the clip 350 upon the flange 352. In order to install the clip 350 upon the flange 352, first the seal 60 is mounted upon the lower rim 356 by inserting the seal 60 through the opening 358. Next, the flange 352 of the drop down bridge 320 is inserted though opening 358 such that the flange 352 engages the upper rim 359 of the clip 350. An alternative embodiment 360 of the drop down clip is shown in FIGS. 23A–B. In this embodiment, the upper rim 362 engages the flange 352 of the drop down bridge 320, but allows the clip 360 to be installed from either the side opening or from the top opening of the clip onto the bottom of the bridge 320. FIG. 24A shows yet another embodiment of the drop down clip 370 which is received within a cylindrical recess 372 of the drop down bridge 320. The clip 370 is shaped similarly to the drop down clip 350 as shown in FIGS. 22A–C, but without the upper rim 359. The clip 370 is inserted within the recess 372 of the bridge 320 after the seal 60 has been inserted therein, and is slightly compressed such that it is retained within the recess due to a spring like action. Finally, FIGS. 24B and 24C illustrate yet another embodiment of the drop down clip 380 which utilizes a plurality of circumferential tabular ends 382 which retain the clip 380 onto the outer diameter of the tubular extension 324 of the drop down bridge 320 due to a spring like action. The circumferential indents 384 retain the seal within the clip 380 utilizing hoop stress. The indents 384 form a diameter which is slightly smaller than the diameter of the seal forming an interference fit which results in the seal being retained in the retainer clip 380. Any of the above described embodiments of the drop down clip may be comprised of any flexible material such as plastic or metal.

As described above, the lower substrate layer 316 comprises a plurality of flow bridges 50 and/or multiport flow bridges 400 as shown in FIGS. 20A–C and FIG. 21. The multiport flow bridges 400 comprise one or more inlet ports 402 and one or more outlet ports 404 which may be in fluid communication with ports from a drop down bridge 320 in the upper substrate level 314. The multiport flow bridge 400 may be formed of two elbow fittings 52 having a rectangular-shaped body and a midsection 410 having preferably a rectangular shaped body with an internal straight through flowpath with one or more ports 404. Additionally, the multiport flow bridge 400 may also comprise a standard end fitting 46 such as a VCR-type fitting instead of an elbow fitting 52.

The lower substrate layer 316 may comprise channel blocks 40 of varying lengths having slots 412 for receiving heating elements (not shown). The channel blocks 40 are secured to the channel blocks located in the upper substrate layer 316 via fasteners 422 which are positioned within holes 414 of the upper channel blocks and into aligned holes 416 of the lower channel blocks 40. This allows the channel blocks 40 to be disconnected from the upper substrate layer and slid out from below, allowing for easier accessibility.

FIG. 25B illustrates an alternative embodiment of the channel blocks 500 having tabular flanges 502 which intermesh or interlock with adjacent recesses 504 of an adjacent channel block. The tabular flanges 502 have mounting holes 506 for receiving fasteners (not shown) therein. The interlocking of the tabular flanges 502 allow the blocks 500 to be closely spaced, while allowing the fasteners to be accessed without the need to remove the surface mounted flow components 12–14. The lower substrate channel block 40 may be secured to the channel block 500 via fasteners secured in diagonally opposed holes 508. Thus the entire channel block 500 complete with fluid components 12–14 mounted thereon may be removed from the assembly as the fasteners securing the blocks 500 to the support blocks 312 and to the lower level substrate 316 are completely accessible via the tabular flanges 502.

Figure 26:
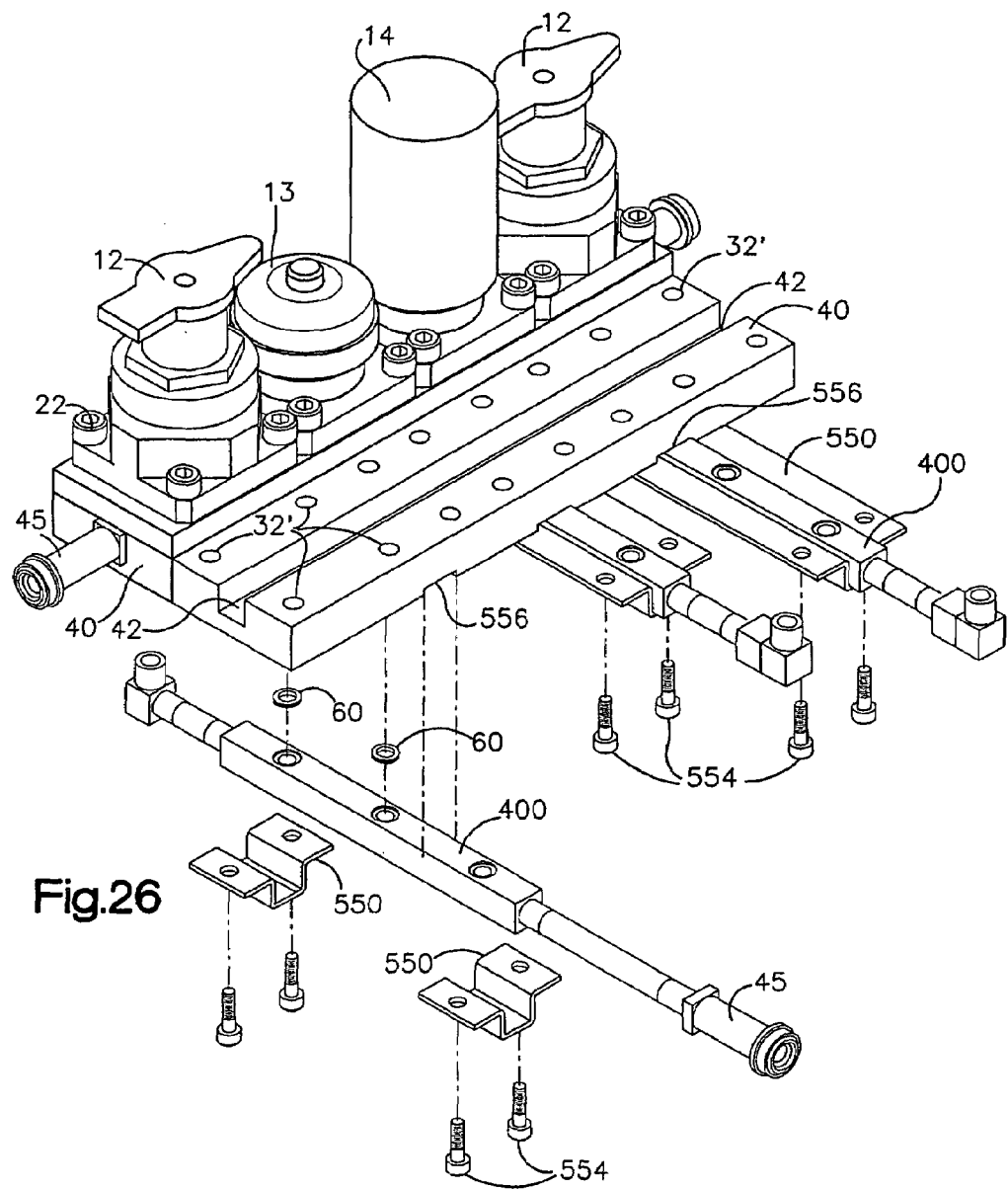
FIG. 26 is a perspective view of a lower substrate manifold shown with retainer straps.
Figure 27A:
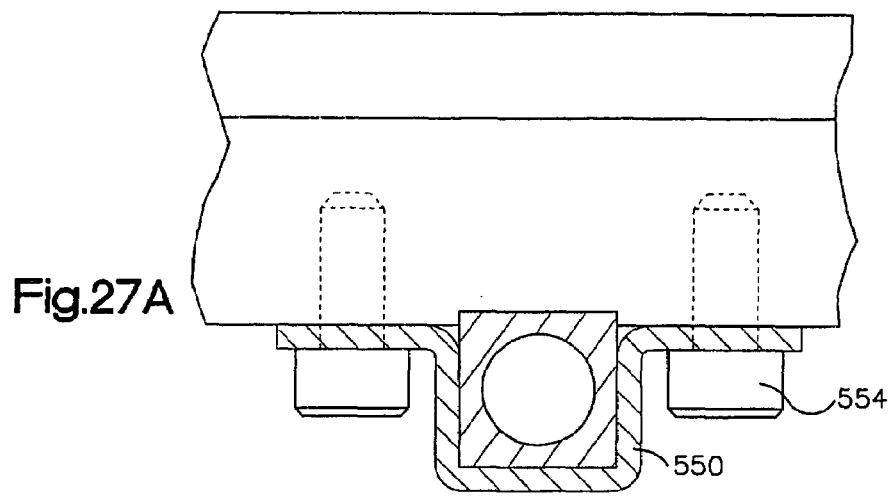
FIG. 27A is a side view of the manifold assembly of FIG. 26 in the direction 27A—27A.

In another aspect of the invention as shown in FIGS. 26 and 27A, the flow bridges 50 or multiport flow bridges 400 may be secured to the channel blocks 40 of the upper substrate level 316 via straps 550. The straps 550 may be of varying lengths, and have a channel 552 formed therein for receiving and supporting the flow bridged 50 and the multiport flow bridges 400. The straps may be secured to the channel blocks 40 via fasteners 554 or any other method apparent to those skilled in the mechanical arts. The channel block 40 may optionally comprise recesses 556 for receiving the multiport flow bridges 400 or the flow bridges 50 partially therein.

Figure 29A:
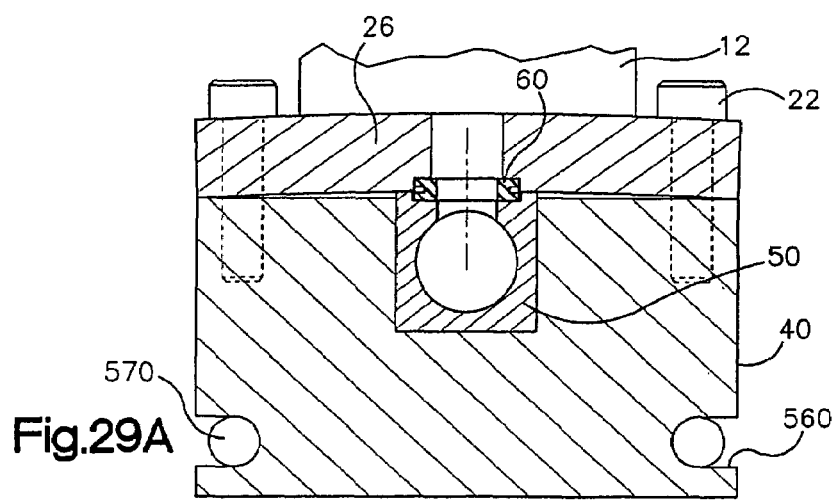
FIGS. 29A and 29B illustrate the preload and load condition respectively, of a heated manifold assembly.
Figure 29B:
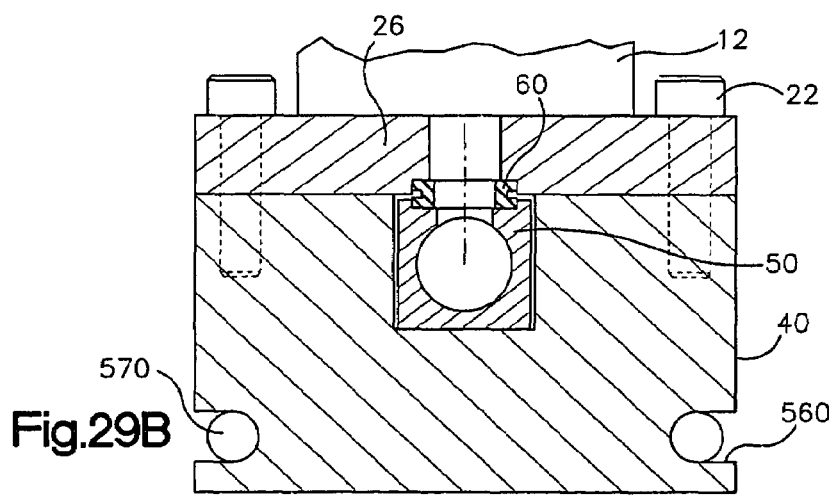

Some applications of gas manifold systems require heated gas which is accomplished by heatiing elements 570 provided in slots of the modular block manifolds such as in slot 560 of channel block 40. Other heating elements such as heating tape may be used as well. Heating of the gas path components 40,50 will result in thermal expansion if the components are made of different materials. It is preferred for semiconductor systems that the flow bridges 50 comprise semiconductor quality material as previously discussed, while aluminum may be preferably utilized for the manifold channel blocks 40. The aluminum channel blocks 40 will thermally expand at a greater rate than the steel flow bridges 50 resulting in a gap between the flow bridges 50 and the mating port of the surface component 12 or a component in the upper substrate level. As shown in an exaggerated manner in FIG. 29A, the system may be designed to be preloaded in order to compensate for the thermal expansion. In order to accomplish this, the height of the flow bridges 50 or the multiport bridges 400 is made slightly greater than the height of the channel, such that when the system is heated to its operating temperature, the upper surface of the flow bridge 50 or multiport bridge 400 is flush with respect to the upper surface of the channel, as shown in FIG. 29B. Additionally, the bolts 22 are preloaded such that when the system is heated to its operating temperature, the bolts have a sufficient tension therein.

Figure 27B:
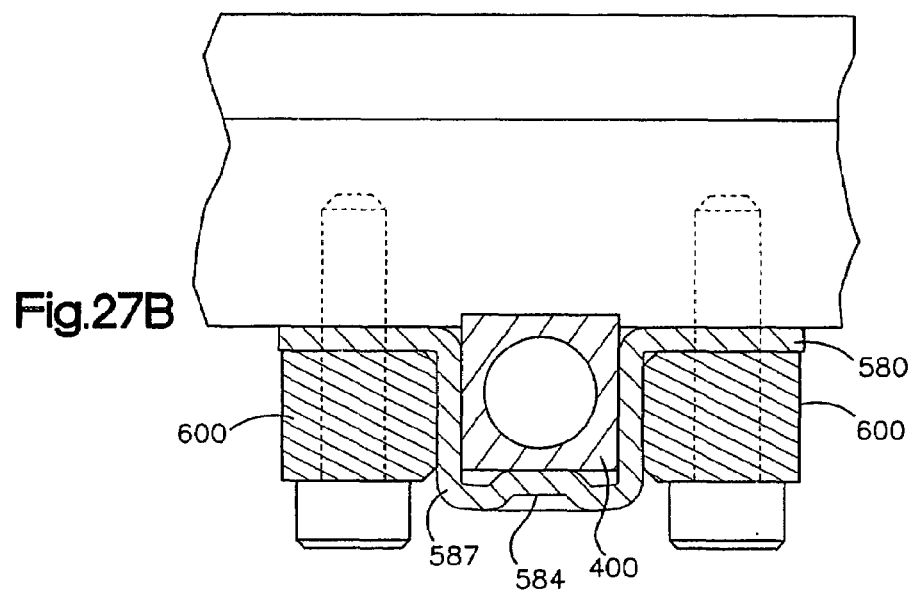
FIGS. 27B–27D are cross-sectional views of the upper and lower substrate shown with an alternative embodiment of the lower substrate level.
Figure 27C:
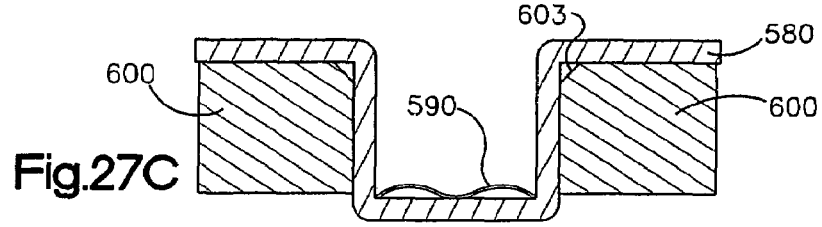
Figure 27D:
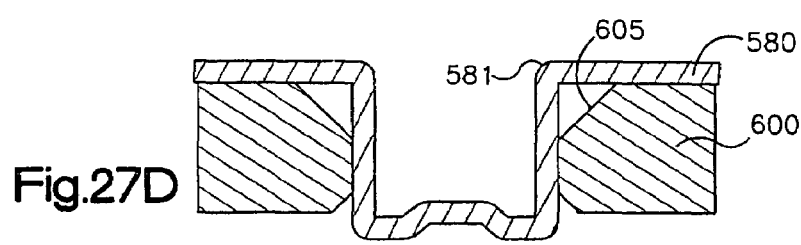

Other ways to compensate for thermal expansion are shown in FIGS. 27B–C. A stamping 580 having a channel formed therein for receiving a multiport bridge 400 or flow bridge 50. The channel 582 has a raised protrusion 584 which has a spring like action. The stamping 580 is preferably made of steel, and is supported between two brackets 600 also preferably made of steel. The stamping 580 and brackets 600 may be secured by fasteners to the above substrate level, which can be made of a different material such as aluminum. In order to compensate for the thermal expansion of the system, the height of the flow bridges 50 or the multiport bridges 400 is made slightly greater than the height of the channel of the stamping, which results in deformation of the raised protrusion due to its spring-like characteristic. Thus when the system is heated to its operating temperature, the upper surface of the flow bridge 50 or multiport bridge 400 will be flush with respect to the upper surface of the channel as the raised protrusion 584 returns to its original shape. Thus the raised protrusion 584 acts as a spring which raises and lowers the flow bridge 50 or multiport bridges 400 in order to compensate for the thermal expansion mismatch between the upper substrate level and the lower substrate level. Alternatively, the stamping may be made having a U shaped channel with a spring 590 placed therein as shown in FIG. 27C. Any spring may be utilized such as for example, a wave spring. FIG. 27D illustrates another aspect of the invention similar to FIG. 27B but with the spring removed and the corners 603 cutaway as shown in FIG. 27D. The stamping 580 acts as a "spring" due to the lessened engagement of the stamping corners 581 against the corners 605. Thus the stamping 580 acts as a cantilevered spring in which the corners 581 can flex downwardly to allow room for the larger multiport bridge 400. As the system is heated, the metal stamping undergoes thermal expansion at a greater rate than the multiport bridge 400, thus causing the metal stamping to unload as described above.

Figure 28:
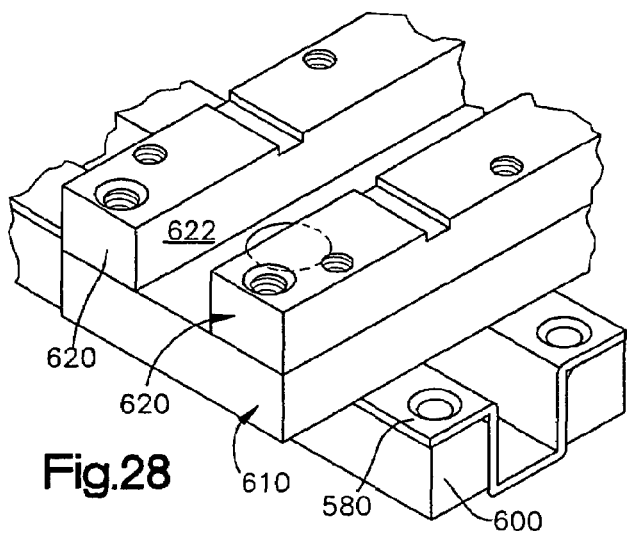
FIG. 28 is a perspective view of an alternative embodiment of the upper and lower substrate levels.

FIG. 28 illustrates yet another embodiment of the invention in which the upper substrate level 316 is formed of two different materials. As shown in FIG. 28, a base plate 610 forms a U shaped channel block together with side bars 620 forming side walls 622. The base plate 600 may be formed of a steel or metal material, while side walls 620 are formed of different lighter weight and less expensive material such as aluminum. The use of the steel side bars 620 together with the steel plate 610 result in a channel block having a reduced thermal expansion mismatch with the flow bridges 50 formed of a SCQ material.

Figure 30A:
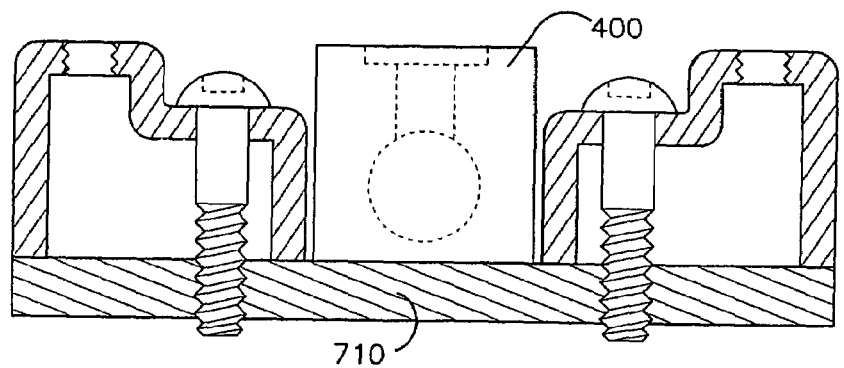
FIGS. 30A and 30B illustrate cross-sectional views of alternative embodiments of the upper substrate level.
Figure 30B:
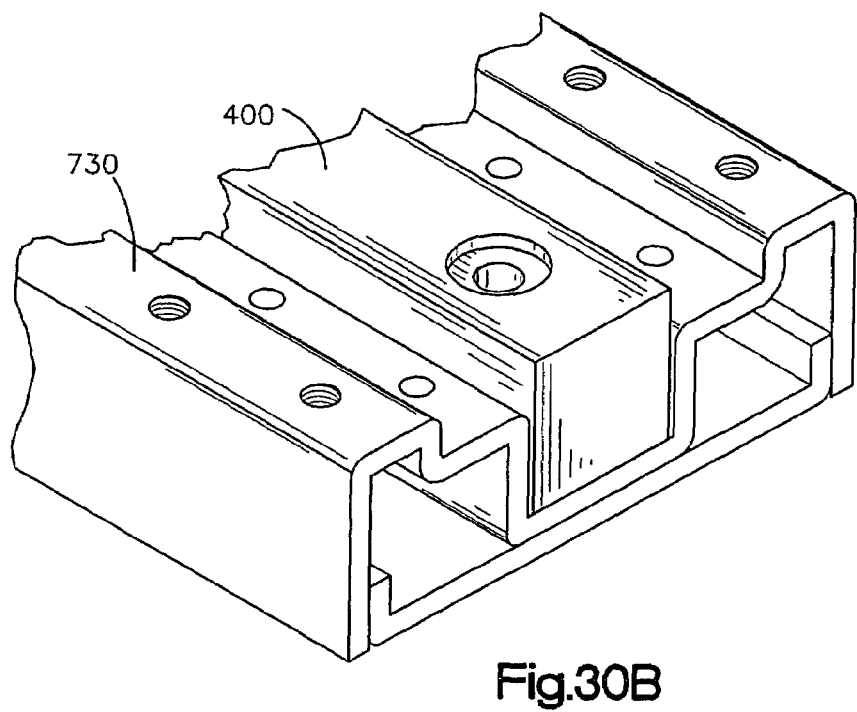

FIGS. 30A and 30B illustrate still another embodiment of the channel block 700. As shown in the figures, a lightweight, inexpensive alternative in forming a channel block 700 may be accomplished by using a base plate 710 which may be formed of sheet metal, together with sidewalls formed of somewhat U-shaped sheet metal stampings. A recessed region is provided in order to allow fasteners to secure the sidewall structure to the baseplate while allowing the head of the fasteners to be flush with the upper surface of the flow bridges 50 or multiport bridges 400 when mounted in the channel. FIG. 30B is a variation of FIG. 30A, in which an upper stamping 730 having outer walls and a U shaped channel formed therein mates with a lower base plate having flanged ends which are welded to the interior of the outer walls.

While the preferred embodiments of the invention has been illustrated and described, it should be understood that variations will become apparent to those skilled in the art. Accordingly, the invention is not limited to the specific embodiments illustrated and described herein, but rather the true scope and spirit of the invention are to be determined by reference to the appended claims.

We claim:

1. A drop down bridge fitting, the fitting comprising:

a first elbow fitting comprising a first port for fluid communication with an alignable port of a first flow path to a fluid component on a first level, said first port of said first elbow fitting lying in a first plane, said first elbow fitting comprising a first internal fluid passageway connected to a first port of a second elbow fitting; said second elbow fitting comprising a second internal fluid passageway that provides fluid communication between said first port of said second elbow fitting and a second port of said second elbow fitting for fluid communication with an alignable port of a second flow path of a second level, said second port of said second elbow fitting lying in a second plane that is parallel to and spaced from said first plane of said first port of said first elbow fitting, said second port of said second elbow fitting and said first port of said first elbow fitting being non-coaxial with respect to each other, said second port of said second elbow fitting facing opposite said first port of said first elbow fitting, said first port of said first elbow fitting and said second port of said second elbow fitting each being surrounded by a compression seal surface, said first internal fluid passageway and said second internal fluid passageway allowing fluid flow from said first port of said first elbow fitting to said second port of said second elbow fitting so that when assembled into a modular flow system fluid flow may be directed between said first level and said second level.

2. The drop down bridge fitting of claim 1 wherein said first elbow fitting first port and said second elbow fitting second port are formed in a respective recessed surface.

3. The drop down bridge fitting of claim 2 wherein each respective recessed surface is formed by a counterbore.

4. The drop down bridge fitting of claim 1 disposed in a surface channel formed in one surface of a substrate block that is adapted to have a fluid component mounted on said one surface.

5. The drop down bridge fitting of claim 4 wherein said second internal fluid passageway extends through a passageway formed in a bottom wall of said channel.

6. The drop down bridge fitting of claim 1, wherein said second elbow fitting comprises a third port for fluid communication with an alignable port of a second flow path to a second fluid component on said first level, said third port being coplanar with said first port of said first elbow fitting so that when assembled into the modular flow system said first port of said first elbow fitting and said third port of second elbow fitting communicate with said first and second fluid components on said first level and said second port of said second elbow fitting is in fluid communication with said second level so that the drop down bridge fitting provides fluid communication between said first and second levels.

7. The drop down bridge fitting of claim 6 wherein said second port of said second elbow fitting and said third port of said second elbow fitting are coaxially aligned with respect to each other.

* * * * *

UNITED STATES PATENT AND TRADEMARK OFFICE
CERTIFICATE OF CORRECTION

| | | |
|---|---|---|
| PATENT NO. | : 7,686,041 B2 | |
| APPLICATION NO. | : 11/378198 | |
| DATED | : March 30, 2010 | |
| INVENTOR(S) | : Paul G. Eidsmore et al. | |

It is certified that error appears in the above-identified patent and that said Letters Patent is hereby corrected as shown below:

Column 1, please delete paragraph "0002", lines 29-36.

Column 1, please add the following as paragraph [0002] --The invention relates in general to manifolds for fluid systems, and more particularly, the invention relates to a modular gas distribution system for use in high purity fluid systems and corrosive fluid systems such as gas systems used, for example, to manufacture semiconductor wafers.--

Signed and Sealed this
Twenty-eighth Day of December, 2010

David J. Kappos
*Director of the United States Patent and Trademark Office*